United States Patent
Mitsuda

(10) Patent No.: US 8,821,608 B2
(45) Date of Patent: Sep. 2, 2014

(54) EXHAUST GAS PURIFICATION DEVICE

(75) Inventor: Masataka Mitsuda, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 1 day.

(21) Appl. No.: 13/261,099

(22) PCT Filed: Jun. 30, 2010

(86) PCT No.: PCT/JP2010/061103
§ 371 (c)(1),
(2), (4) Date: Jan. 20, 2012

(87) PCT Pub. No.: WO2011/001997
PCT Pub. Date: Jan. 6, 2011

(65) Prior Publication Data
US 2012/0102932 A1    May 3, 2012

(30) Foreign Application Priority Data

Jul. 2, 2009 (JP) ................. 2009-157451

(51) Int. Cl.
*B01D 50/00* (2006.01)
*B01D 39/20* (2006.01)
*B01D 39/14* (2006.01)
*B01D 39/06* (2006.01)
*B01D 24/00* (2006.01)
*B01D 59/50* (2006.01)
*F01N 13/14* (2010.01)
*F01N 3/021* (2006.01)
*F01N 13/18* (2010.01)
*F02M 63/02* (2006.01)
*F01N 13/02* (2010.01)

(52) U.S. Cl.
CPC ........... *F01N 3/0211* (2013.01); *F01N 2450/24* (2013.01); *F01N 2470/18* (2013.01); *F02M 63/0225* (2013.01); *F01N 2470/24* (2013.01); *F01N 2013/026* (2013.01); *F01N 2450/30* (2013.01); *F01N 13/143* (2013.01); *Y02T 10/20* (2013.01); *F01N 13/1855* (2013.01); *F01N 2470/02* (2013.01); *F01N 2590/08* (2013.01)

USPC ................ 55/523; 55/522; 55/524; 55/385.3; 422/169; 422/170; 422/171; 422/172; 422/177; 422/178; 422/179; 422/180; 422/181; 422/182; 60/297

(58) Field of Classification Search
CPC .............. F01N 13/1855; F01N 13/143; F01N 2450/24; F01N 2013/026; F01N 3/0211; F01N 2470/18; F01N 2470/02; F01N 2590/08; F01N 2450/30; F01N 2470/24; F02M 63/0225; Y02T 10/20
USPC ................. 55/522–524, 385.3; 422/169–172, 422/177–182; 60/297
See application file for complete search history.

(56) References Cited

U.S. PATENT DOCUMENTS 3,854,888 A    12/1974  Frietzsche et al.
4,032,310 A *  6/1977  Ignoffo ........................ 422/170
(Continued)

FOREIGN PATENT DOCUMENTS

JP      9-163562      6/1997
JP    2000-145430    5/2000
(Continued)

OTHER PUBLICATIONS

Microfilm of the specification and drawings annexed to the request of Japanese Utility Model Application No. 84553/1979 (Laid-open No. 2491/1981-JP 56-2491) (Nishimatsu Construction Co., Ltd.), Jan. 10, 1981, entire text; all drawings (Family: none).

*Primary Examiner* — Amber Orlando
(74) *Attorney, Agent, or Firm* — Jordan and Hamburg LLP

(57) ABSTRACT

Inner cases are connected to outer cases through joining flanges which protrude toward outer peripheries of the outer cases. A plurality of combinations each including filters, the inner cases, and the outer cases are provided. Both the joining flanges are sandwiched and fixed between a pair of sandwiching flanges, thereby connecting the plurality of outer cases to each other.

2 Claims, 29 Drawing Sheets

(56) References Cited

U.S. PATENT DOCUMENTS

| | | | |
|---|---|---|---|
| 4,248,833 A * | 2/1981 | Aoyama | 422/179 |
| 4,535,588 A * | 8/1985 | Sato et al. | 60/286 |
| 4,601,168 A * | 7/1986 | Harris | 60/299 |
| 4,866,932 A * | 9/1989 | Morita et al. | 60/288 |
| 5,426,269 A * | 6/1995 | Wagner et al. | 181/232 |
| 5,457,945 A * | 10/1995 | Adiletta | 55/301 |
| 5,584,178 A * | 12/1996 | Naegeli et al. | 60/303 |
| 5,953,909 A * | 9/1999 | Waltrip, III | 60/275 |
| 6,550,573 B2 * | 4/2003 | Wagner et al. | 181/255 |
| 7,779,624 B2 * | 8/2010 | Belisle et al. | 60/299 |
| 7,997,071 B2 * | 8/2011 | Blaisdell | 60/324 |
| 8,246,709 B2 * | 8/2012 | Franken | 55/503 |
| 2003/0159436 A1 * | 8/2003 | Foster et al. | 60/297 |
| 2004/0056485 A1 * | 3/2004 | Love et al. | 285/363 |
| 2005/0115224 A1 * | 6/2005 | Kojima | 60/282 |
| 2006/0053779 A1 * | 3/2006 | Belisle et al. | 60/299 |
| 2006/0067860 A1 * | 3/2006 | Faircloth et al. | 422/171 |
| 2007/0119155 A1 | 5/2007 | Tongu et al. | |
| 2011/0023471 A1 * | 2/2011 | Werni et al. | 60/297 |
| 2011/0142723 A1 * | 6/2011 | Yamamoto | 422/177 |

FOREIGN PATENT DOCUMENTS

| | | |
|---|---|---|
| JP | 2001-173429 | 6/2001 |
| JP | 2003-027922 | 1/2003 |
| JP | 2003-120277 | 4/2003 |
| JP | 2005-076459 | 3/2005 |
| JP | 2005-113795 | 4/2005 |
| JP | 2008-082201 | 4/2008 |
| JP | 2009-085171 | 4/2009 |

* cited by examiner (a)

(b)

(c)

EXHAUST GAS PURIFICATION DEVICE

TECHNICAL FIELD

The invention of the present application relates to an exhaust gas purification device provided in a diesel engine, and more particularly, to an exhaust gas purification device which removes particle materials (soot and particulates) included in exhaust gas.

BACKGROUND ART

There is a conventionally known technique in which a diesel particulate filter (DPF, hereinafter) is provided in an exhaust gas path of a diesel engine as an exhaust gas purification device (post-processing system), and exhaust gas discharged from the diesel engine is purified by DPF (see Patent Documents 1 to 3 for example). There is also a known technique in which an inner case (filter case) is provided in an outer case (casing) in a DPF, and a filter member such as an oxidation catalyst and a soot filter is disposed in the inner case (see Patent Document 4 for example).

CITATION LIST

Patent Literature

Patent Document 1: Japanese Unexamined Patent Publication No. 2000-145430
Patent Document 2: Japanese Unexamined Patent Publication No. 2003-27922
Patent Document 3: Japanese Unexamined Patent Publication No. 2008-82201
Patent Document 4: Japanese Unexamined Patent Publication No. 2001-173429

SUMMARY OF INVENTION

Technical Problem

In a structure having a plurality of inner cases in which filter members are incorporated, and a plurality of outer cases in which the inner cases are respectively incorporated, when the outer cases are detachably connected to each other, flanges bodies are welded and fixed to connecting sides of the outer cases, and adjacent flange bodies are superposed and fastened to each other through bolts in many cases. In the structure in which the flange bodies are welded and fixed to the outer cases in this manner, however, when a DPF is directly mounted on the diesel engine for example, vibration and stress of the diesel engine are applied to the outer cases and stress is concentrated on a welded portion between the outer case and the flange. As a result of the stress concentration, there is a problem that the welded portion is damaged or the outer case is deformed or damaged. There is fear that flatness of the flange body is deteriorated due to welding distortion (flat surface of the flange body is distorted) and it is not possible to completely deny a possibility that exhaust gas leaks from the superposed portion between the flange bodies.

Hence, in view of the existing circumstances, it is a technical object of the invention of the application to provide an improved exhaust gas purification device.

Solution to Problem

A first aspect of an invention provides an exhaust gas purification device comprising a filter for purifying exhaust gas discharged from an engine, inner cases for incorporating the filter, and outer cases for incorporating the inner cases, wherein the inner cases are connected to the outer cases through a pair of joining flanges which protrude toward outer peripheries of the outer cases, the exhaust gas purification device includes a plurality of combinations of the filter, the inner cases, and the outer cases, and both the joining flanges are sandwiched and fixed between a pair of sandwiching flanges, thereby connecting the plurality of outer cases to each other.

According to a second aspect of the invention, in the exhaust gas purification device according to the first aspect of the invention, a support body for supporting the outer case on the engine is fastened to at least one of the sandwiching flanges.

According to a third aspect of the invention, in the exhaust gas purification device according to the second aspect of the invention, a plurality of bolt fastening portions are provided on each of the sandwiching flanges, the sandwiching flange to which the support body is fastened is provided with a support body fastening portion between the adjacent bolt fastening portions.

According to a fourth aspect of the invention, in the exhaust gas purification device described according to any one of first to third aspects of the invention, each of the sandwiching flanges includes a plurality of units divided in a circumferential direction of the outer case, and the plurality of units surround an outer periphery of the outer case.

Advantageous Effect of Invention

According to the first aspect of the invention, there is provided the exhaust gas purification device including a filter which purifies exhaust gas discharged from an engine, inner cases in which the filter is incorporated, and outer cases in which the inner cases are incorporated, wherein the inner cases are connected to the outer cases through a pair of joining flanges which protrude toward outer peripheries of the outer cases, the exhaust gas purification device includes a plurality of combinations of the filter, the inner cases, and the outer cases, and both the joining flanges are sandwiched and fixed between a pair of sandwiching flanges, thereby connecting the plurality of outer cases to each other. Therefore, the adjacent joining flanges can be sandwiched from both sides and connected (intimately connected) by both the sandwiching flanges under pressure. Further, since the sandwiching flange is formed as a separate member without being welded to the outer case, there is no fear that a problem of stress concentration or distortion caused by welding is generated in a relation between the sandwiching flange and the outer case. Hence, a substantially uniform pressing force can be applied to both the joining flanges entirely, and high surface pressures of seal surfaces (sandwiching surfaces) of the sandwiching flanges can be maintained. As a result, there is an effect that it is possible to reliably prevent exhaust gas from leaking from between both the joining flanges.

According to the second aspect of the invention, in the exhaust gas purification device described according to the first aspect of the invention, a support body which supports the outer case on the engine is fastened to at least one of the sandwiching flanges. According to this, the support body is also formed as a separate member without being welded to the sandwiching flange, and it is possible to avoid the problem of stress concentration or distortion caused by welding also in a relation between the support body and at least one of the sandwiching flanges. Therefore, there is an effect that it is possible to enhance adhesion when the support body and at least one of the sandwiching flanges are fastened to each other, and to enhance the rigidity.

According to the third aspect of the invention, in the exhaust gas purification device described according to the second aspect of the invention, a plurality of bolt fastening portions are provided on each of the sandwiching flanges, and the sandwiching flange to which the support body is fastened is provided with a support body fastening portion between the adjacent bolt fastening portions. Hence, even if the support body tries to deform by stress caused by vibration of the engine for example, it is possible to remarkably suppress fear that the support body fastening portion and thus the sandwiching flange are deformed by the action of the adjacent bolt fastening portions. As a result, there is an effect that it is possible to further lower the possibility of leakage of exhaust gas.

According to the fourth aspect of the invention, in the exhaust gas purification device described according to any one of first to third aspects, each of the sandwiching flanges includes a plurality of units divided in a circumferential direction of the outer case, and the plurality of units surround an outer periphery of the outer case. Hence, although the sandwiching flanges include the plurality of units, they can be handled as one integral piece. Therefore, it is easy to assemble the device and the assembling operability can be enhanced. There is an effect that it is possible to suppress machining cost and assembling cost, and to provide the exhaust gas purification device having high sealing performance.

DESCRIPTION OF EMBODIMENTS

An embodiment in which the invention of the present application is embodied will be described below based on the drawings.

(1) Entire Structure of Diesel Engine

An entire structure of a common rail type diesel engine 70 will be first described mainly with reference to FIGS. 1 to 5. In the following description, both sides which are parallel to a crank axis "a" (both sides of the crank axis "a") are called right and left, a side on the side of a flywheel housing 78 is called a front side, a side on the side of a cooling fan 76 is called a rear side, and based on these sides, a positional relation of four directions and upper and lower directions of the diesel engine 70 will be described for convenience sake.

Figure 1:
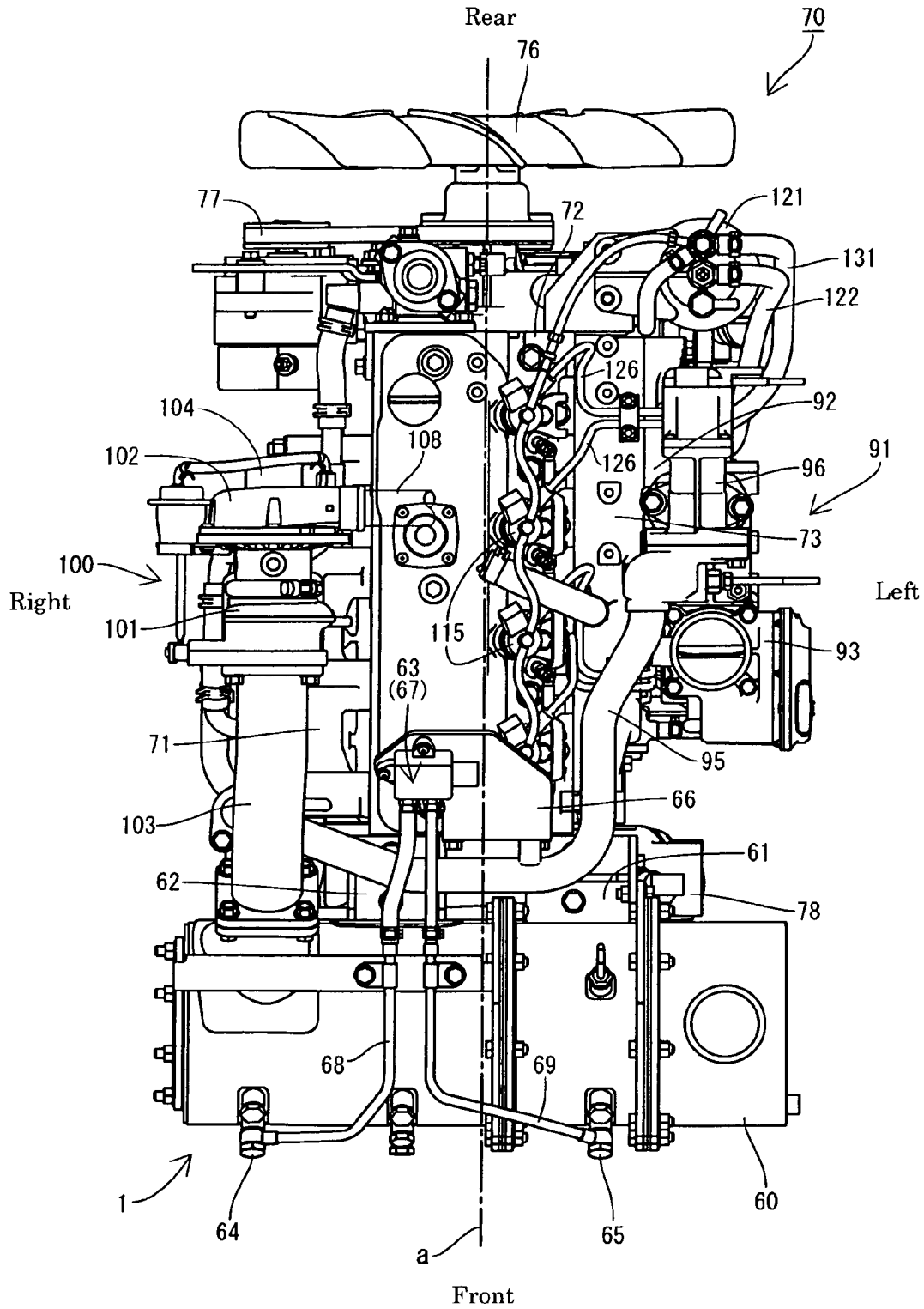
FIG. 1 is a plan view of a diesel engine.
Figure 2:
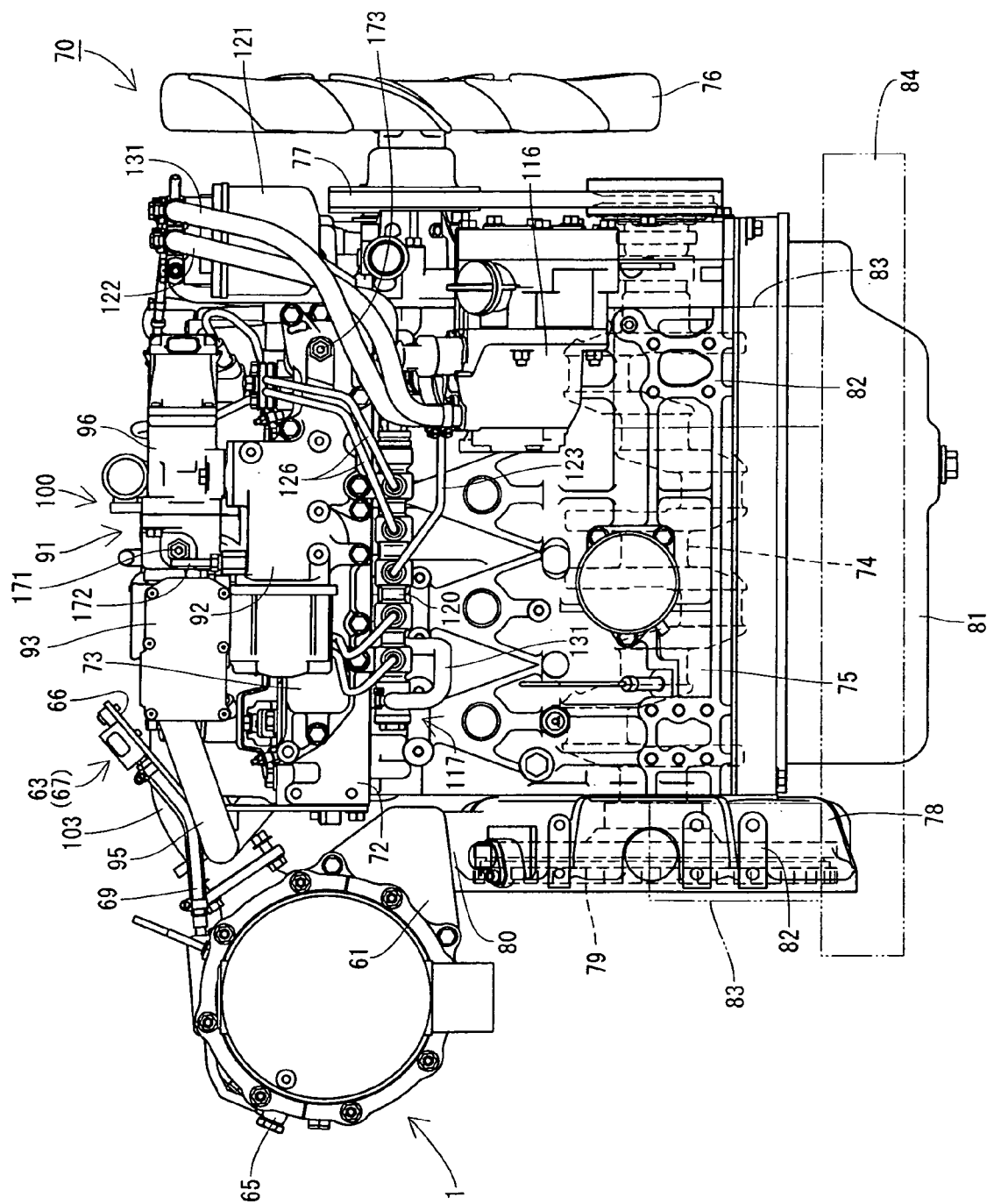
FIG. 2 is a side view of the diesel engine on the side of an intake manifold.
Figure 3:
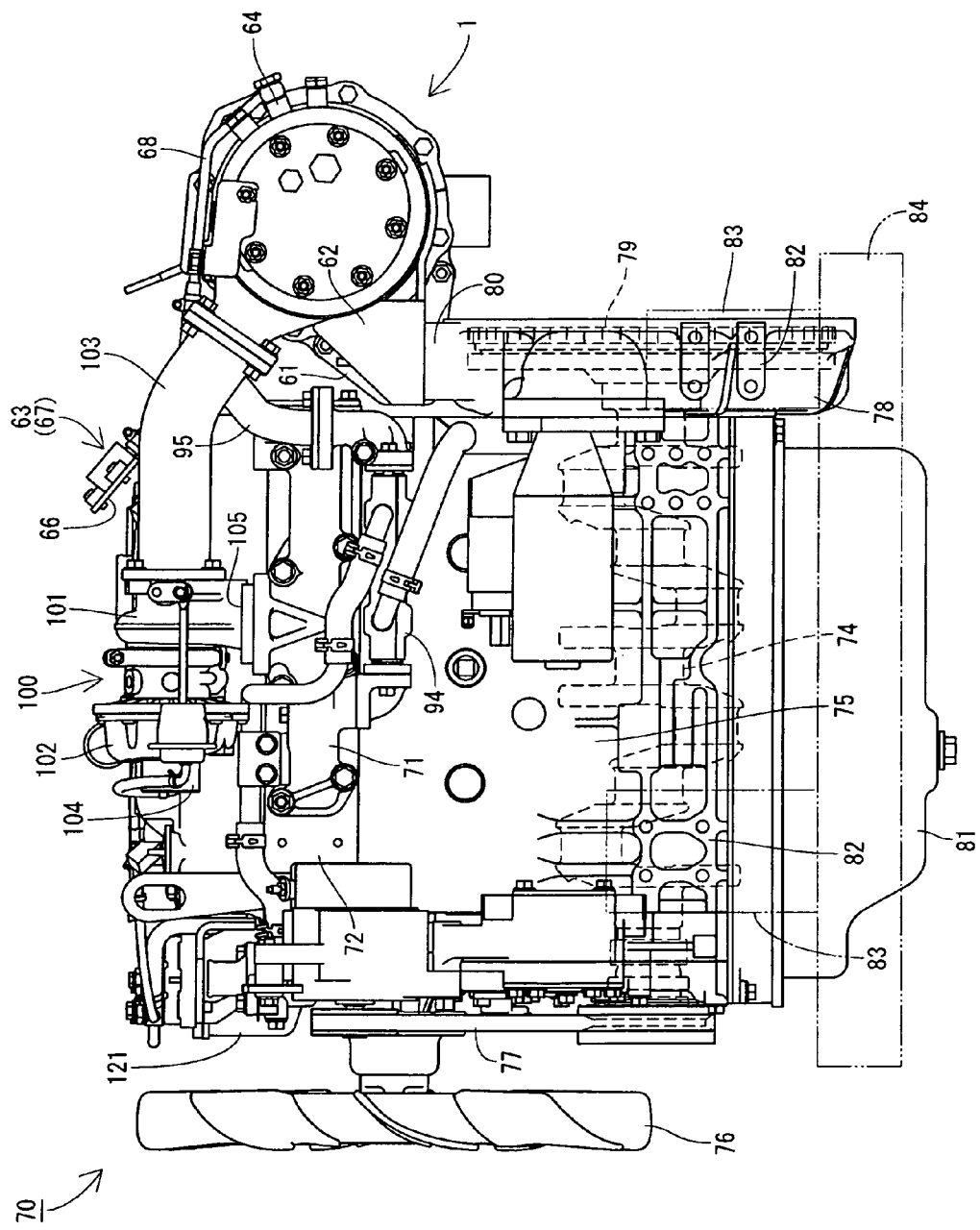
FIG. 3 is a side view of the diesel engine on the side of an exhaust manifold.
Figure 4:
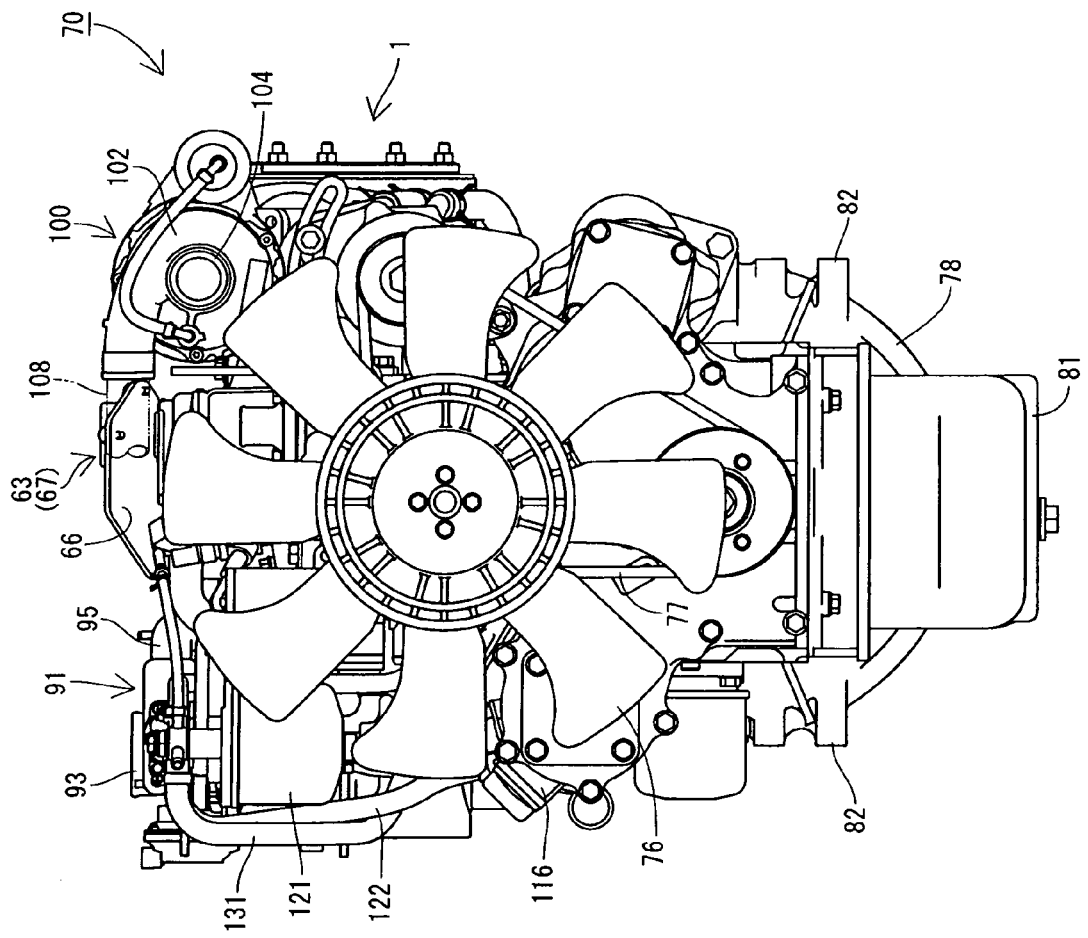
FIG. 4 is a side view of the diesel engine on the side of a cooling fan.
Figure 5:
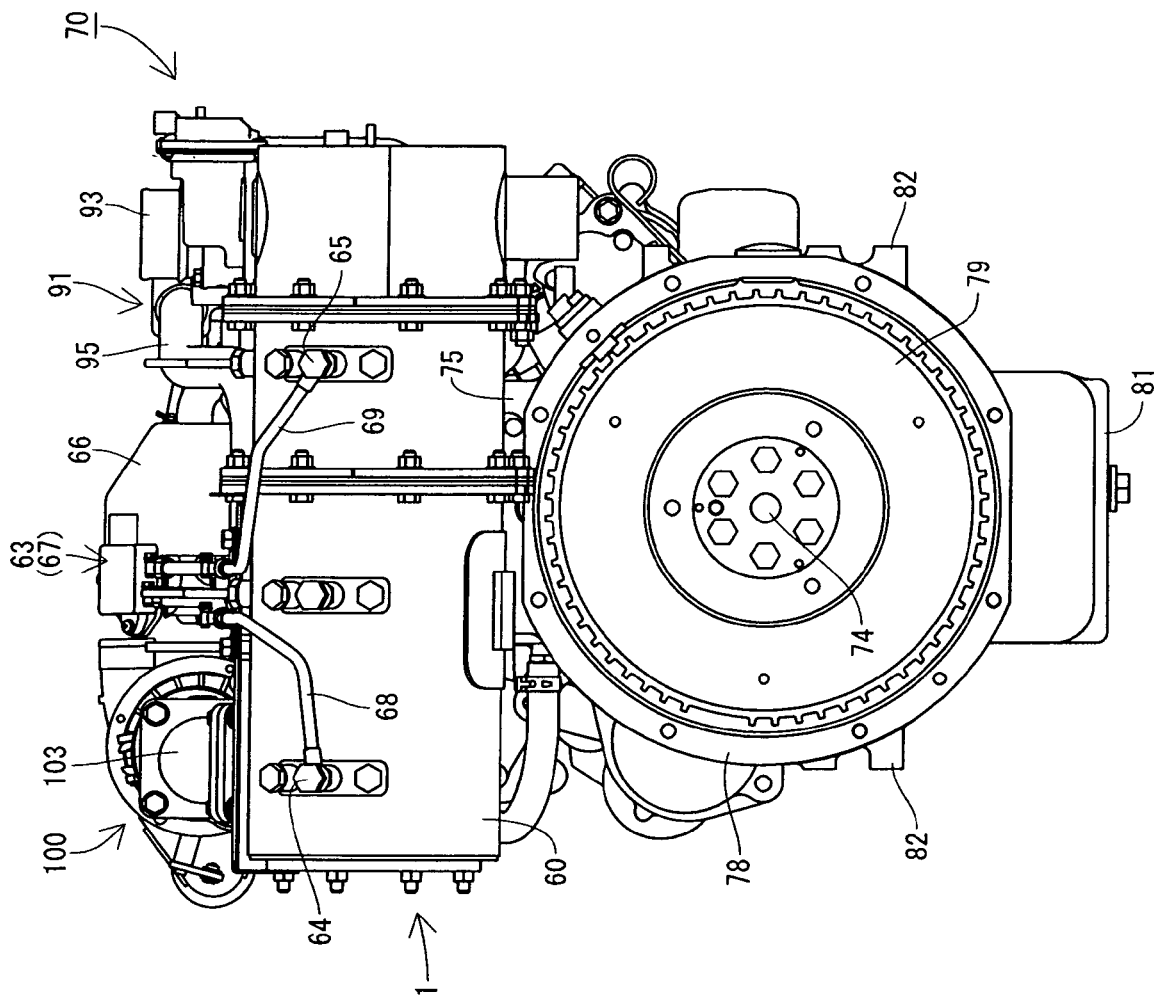
FIG. 5 is a side view of the diesel engine on the side of a flywheel housing.

As shown in FIGS. 1 to 3, the diesel engine 70 includes an intake manifold 73 disposed on one side thereof which is parallel to the crank axis "a", and an exhaust manifold 71 disposed on the other side of the diesel engine 70. In the embodiment, the intake manifold 73 is disposed on a left side surface of the cylinder head 72 and the exhaust manifold 71 is disposed on a right side surface of the cylinder head 72. The cylinder head 72 is mounted on an engine block 75 in which a crankshaft 74 and a piston (not shown) are incorporated. Front and rear tip ends of the crankshaft 74 project from both front and rear surfaces of the engine block 75. The cooling fan 76 is provided on one side of the diesel engine 70 which intersects with the crank axis "a". In the embodiment, the cooling fan 76 is located on the rear surface side of the engine block 75. A rotation force is transmitted from a rear end side of the crankshaft 74 to the cooling fan 76 through a V-belt 77.

As shown in FIGS. 1 to 3, the flywheel housing 78 is fixed to the other side (front surface side of the engine block 75 in the embodiment) of the diesel engine 70 which intersects with the crank axis "a". A flywheel 79 is disposed in the flywheel housing 78. The flywheel 79 is pivotally supported on a front end of the crankshaft 74, and the flywheel 79 integrally rotates with the crankshaft 74. Power of the diesel engine 70 is taken out to an operating portion of an operating machine (such as a hydraulic shovel and a forklift) through the flywheel 79.

An oil pan 81 is disposed on a lower surface of the engine block 75. Engine foot mounting portions 82 are provided on right and left side surfaces of the engine block 75 and on right and left side surfaces of the flywheel housing 78. Engine feet 83 having vibration isolation rubbers are respectively fastened to the engine foot mounting portions 82. The diesel engine 70 is supported, in a vibration isolation manner, by an engine support chassis 84 such as an operating machine (such as a hydraulic shovel and a forklift) through the engine feet 83.

An inlet of the intake manifold 73 is connected to an air cleaner (not shown) through a collector 92 of a later-described EGR apparatus 91 (exhaust gas recirculation apparatus). New air (outside air) sucked into the air cleaner is purified (dust in the air is removed) by the air cleaner and then, the air is sent to the intake manifold 73 through the collector 92 and is supplied to each of cylinders of the diesel engine 70.

The EGR apparatus 91 includes the collector (EGR body case) 92 as a relay pipe through which new air (outside air from air cleaner) and recirculation exhaust gas (EGR gas from exhaust manifold 71) of the diesel engine 70 are mixed with each other and supplied to the intake manifold 73. The EGR apparatus 91 also includes an intake throttle member 93 which brings the collector 92 into communication with the air cleaner, a reflux exhaust gas pipe 95 as a reflux pipe which is connected to the exhaust manifold 71 through an EGR cooler 94, and an EGR valve member 96 which brings the collector 92 into communication with the reflux exhaust gas pipe 95.

That is, the intake throttle member 93 which introduces new air and the intake manifold 73 are brought into communication with and connected to each other through the collector 92. The EGR valve member 96 which is connected to an outlet of the reflux exhaust gas pipe 95 is brought into communication with and connected to the collector 92. The collector 92 is substantially formed into a longitudinally long cylindrical shape, and the intake throttle member 93 is fastened to an air-supply intake side (front portion in the longitudinal direction) of the collector 92 through a bolt. An air-supply discharging side of the collector 92 is fastened to an inlet of the intake manifold 73 through a bolt. The EGR valve member 96 adjusts a supply amount of EGR gas to the collector 92 by adjusting an opening degree of the EGR valve 97 (see FIG. 15) existing in the EGR valve member 96.

New air is supplied into the collector 92, and EGR gas (a portion of exhaust gas discharged from the exhaust manifold 71) is supplied from the exhaust manifold 71 into the collector 92 through the EGR valve member 96. The new air and the EGR gas from the exhaust manifold 71 are mixed in the collector 92 and then, the mixture gas in the collector 92 is supplied to the intake manifold 73. That is, a portion of the exhaust gas discharged from the diesel engine 70 to the exhaust manifold 71 is refluxed from the intake manifold 73 into the diesel engine 70. According to this, the maximum combustion temperature at the time of high load operation is lowered and a discharge amount of NOx (nitrogen oxide) from the diesel engine 70 is reduced.

As apparent from the above-described configuration, the exhaust gas purification device includes the collector 92 as the relay pipe which brings the intake manifold 73 and the intake throttle member 93 for introducing new air into communication with each other, and the outlet of the reflux pipe extending from the exhaust manifold 71 is brought into communication with and connected to the collector 92 through the EGR valve member 96. Hence, new air and EGR gas are mixed before they are sent into the intake manifold 73. Therefore, the EGR gas can widely be dispersed into the mixture gas, and variation (unevenness) in the gas mixture state is reduced before the gas is sent into the intake manifold 73. As a result, the mixture gas having less unevenness can be distributed to the cylinders of the diesel engine 70, and it is possible to suppress the variation in the EGR gas amount between the cylinders. As a result, it is possible to suppress the generation of black smoke and to reduce the amount of NOx while excellently maintaining a combustion state of the diesel engine 70.

As shown in FIGS. 1 and 3, a turbo supercharger 100 is disposed on a right side of the cylinder head 72 and above the exhaust manifold 71. The turbo supercharger 100 includes a turbine case 101 in which a turbine wheel (not shown) is incorporated, and a compressor case 102 in which blower wheel (not shown) is incorporated. An outlet of the exhaust manifold 71 is connected to an exhaust gas intake pipe 105 of the turbine case 101. A tail pipe (not shown) is connected to an exhaust gas discharge pipe 103 of the turbine case 101 through a diesel particulate filter 1 (DPF, hereinafter) as the exhaust gas purification device. Exhaust gas discharged from the cylinders of the diesel engine 70 into the exhaust manifold 71 is discharged outside from the tail pipe through the turbo supercharger 100 and the DPF 1.

An air-supply discharge side of the air cleaner is connected to an air-supply intake side of the compressor case 102 through an air-supply pipe. An air-supply intake side of the intake throttle member 93 is connected to an air-supply discharge side of the compressor case 102 through a supercharge pipe 108. New air (outside air) from which dust is removed by the air cleaner is sent from the compressor case 102 to the intake manifold 73 through the intake throttle member 93 and the collector 92, and then the air is supplied to the cylinders of the diesel engine 70.

The DPF 1 as the exhaust gas purification device is for collecting particulate materials (PM) in exhaust gas. As shown in FIGS. 1 to 4, the DPF 1 has a substantially cylindrical shape which is long in a lateral direction intersecting with the crankshaft 74 as viewed from above, and the DPF 1 is disposed on the flywheel housing 78 such that the DPF 1 is opposed to a front side surface of the cylinder head 72. An exhaust gas intake side and an exhaust gas discharge side are respectively provided on right and left sides of the DPF 1 (one end thereof in the longitudinal direction and the other end thereof). The exhaust gas intake side of the DPF 1 is connected to the exhaust gas discharge pipe 103 of the turbine case 101. The exhaust gas discharge side of the DPF 1 is connected to an exhaust gas intake side of a tail pipe 107.

Figure 6:
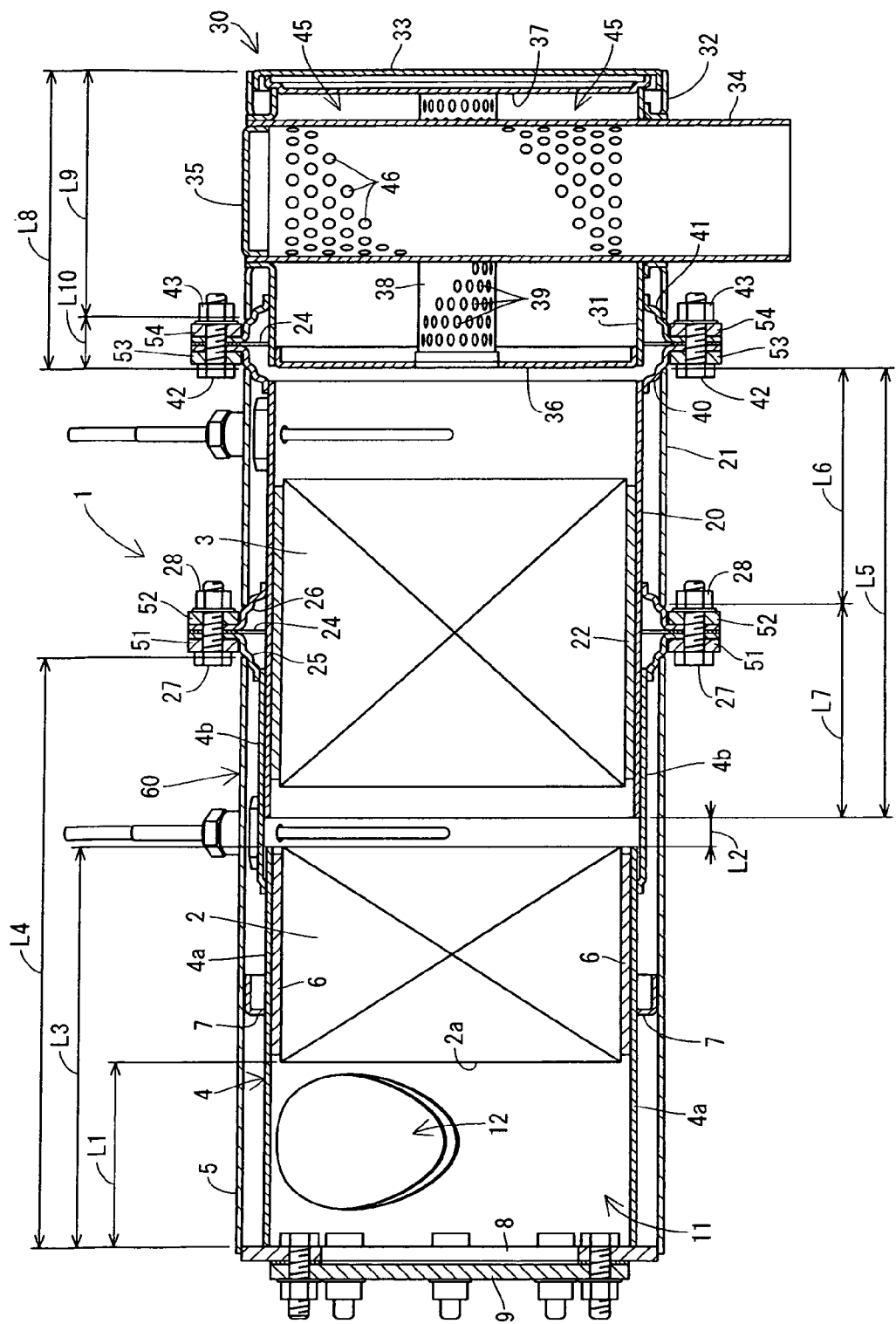
FIG. 6 is a sectional view for explaining a DPF.

The DPF 1 has substantially cylindrical inner cases 4 and 20 incorporated in a DPF casing 60 made of heat-resistant metal, and a diesel oxidation catalyst 2 such as platinum and a soot filter 3 of honeycomb structure are serially arranged and accommodated in the inner cases 4 and 20 (see FIG. 6). As shown in FIGS. 1 to 4, the DPF 1 of the embodiment is mounted on the flywheel housing 78 through a pair of right and left bracket feet 61 and 62 as support bodies. In this case, one end of the left bracket foot 61 is fastened to a flange provided on an outer periphery of the DPF casing 60 through bolts. One end of the right bracket foot 62 is welded and fixed to an outer periphery of the DPF casing 60. The other ends of the both right and left bracket feet 61 and 62 are fastened, through bolts, to a DPF mounting portion 80 formed on an upper surface of the flywheel housing 78. That is, the DPF 1 is stably connected to and supported by an upper portion of the flywheel housing 78 which is a high rigidity member by both the right and left bracket feet 61 and 62 and the exhaust gas discharge pipe 103 of the turbine case 101.

As shown in FIGS. 1 to 4, the DPF casing 60 includes an inlet side sensing body 64 and an outlet side sensing body 65 of a differential pressure sensor 63 which detects a clogged state of an interior of the DPF casing 60. The differential pressure sensor 63 detects a pressure difference between upstream and downstream of the soot filter 3 in the DPF 1. An amount of particulate materials deposited on the soot filter 3 is converted based on the pressure difference, and the clogged state in the DPF 1 can be grasped. Regeneration of the soot filter 3 is controlled based on a pressure difference detected by the differential pressure sensor 63 by operating the intake throttle member 93 for example. In the embodiment, a detecting body 67 is mounted on a sensor bracket 66 which is fixed to a front side surface of the cylinder head 72. Both the sensing bodies 64 and 65 on the side of the DPF casing 60 are connected to the detecting body 67 of the differential pressure sensor 63 respectively through harnesses 68 and 69.

In the above configuration, exhaust gas of the diesel engine 70 flows from the exhaust gas discharge pipe 103 of the turbine case 101 into a space of the DPF casing 60 on an upstream side of the diesel oxidation catalyst 2, passes through the diesel oxidation catalyst 2 and the soot filter 3 in this order, and is purified. At this stage, particulate materials in the exhaust gas cannot pass through a porous partition wall between cells in the soot filter 3 and are collected. Thereafter, the exhaust gas passes through the diesel oxidation catalyst 2 and the soot filter 3 and exhaust gas is released into the tail pipe 107.

When exhaust gas passes through the diesel oxidation catalyst 2 and the soot filter 3, if a temperature of the exhaust gas exceeds a temperature at which regeneration can be carried out (about 300° C. for example), NO (nitric oxide) in the exhaust gas is oxidized into unstable NO2 (nitrogen dioxide) by the action of the diesel oxidation catalyst 2. Particulate materials deposited on the soot filter 3 is oxidized and removed by O (oxygen) released when NO2 returns to NO, and the particulate materials collecting ability of the soot filter 3 is recovered (soot filter 3 is regenerated).

(2) Common Rail System and Fuel System Structure of Diesel Engine

Figure 7:
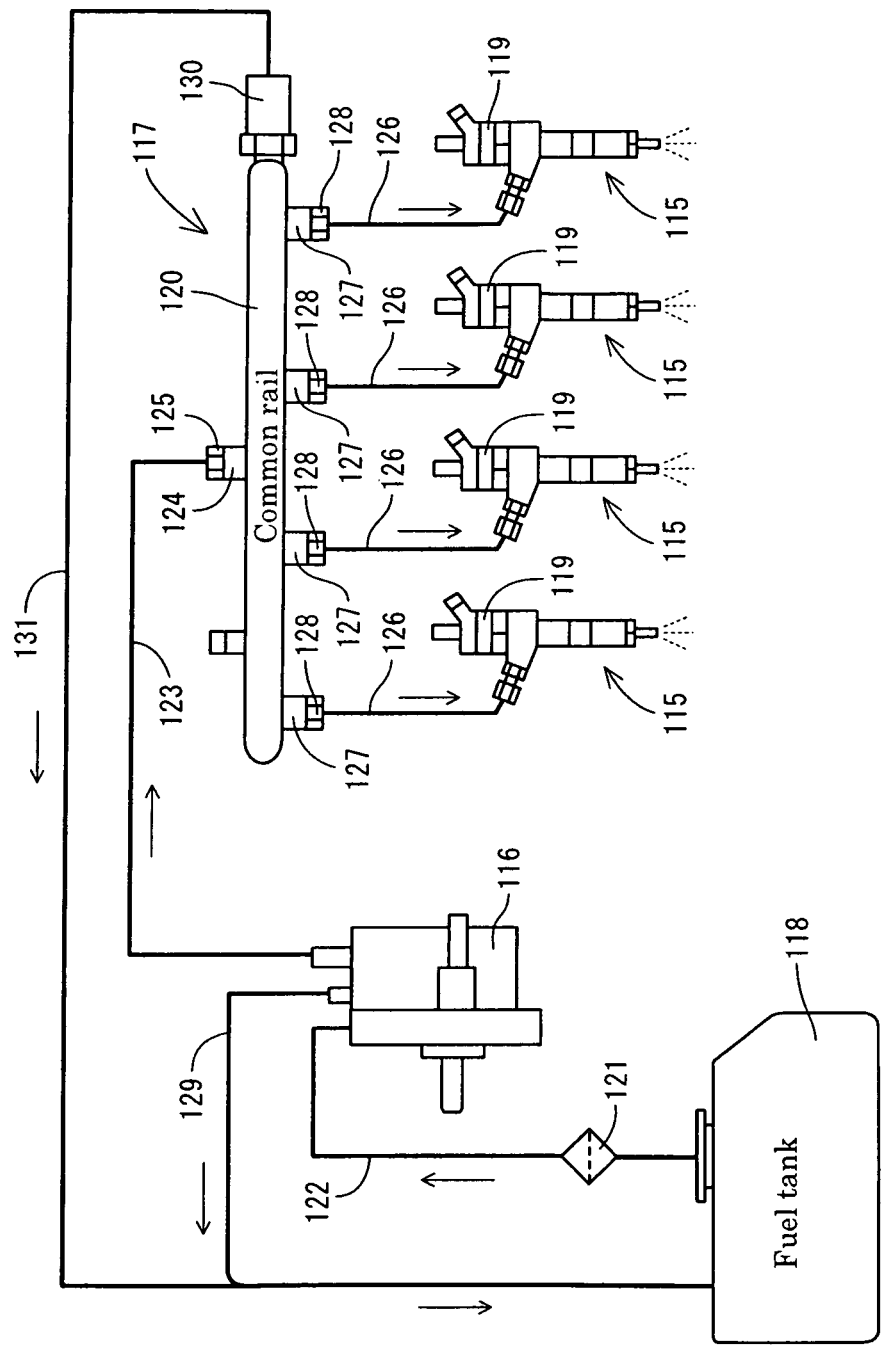
FIG. 7 is a diagram for explaining a fuel system of the diesel engine.
Figure 8:
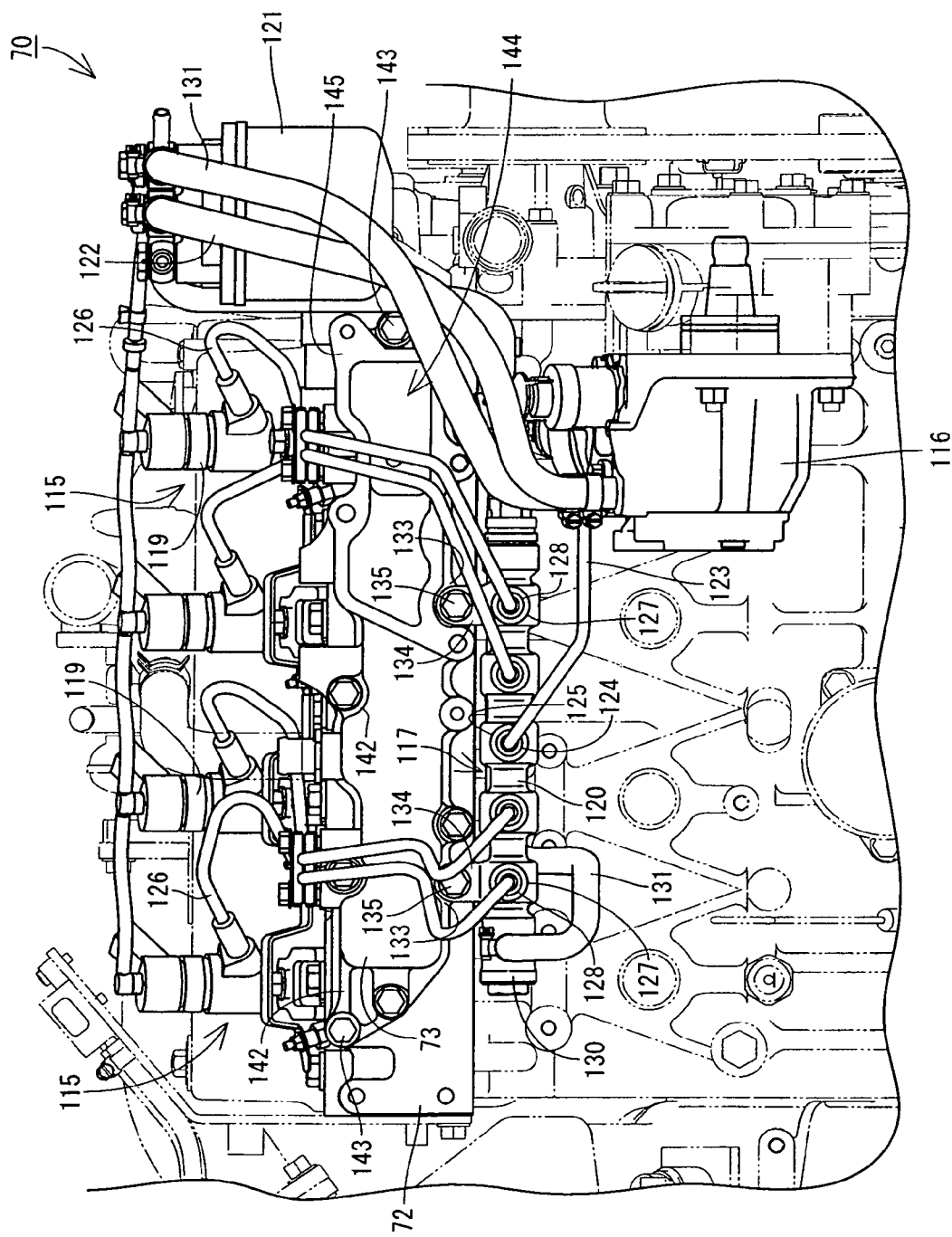
FIG. 8 is an enlarged side view of an essential portion of a common rail system.

Next, a common rail system 117 and a fuel system structure of the diesel engine 70 will be described with reference to FIGS. 2, 7, and 8. In FIG. 8, the collector 92 mounted on the intake manifold 73 and the EGR apparatus 91 such as the EGR valve member 96 are omitted for convenience sake. As shown in FIGS. 2, 7, and 8, a fuel tank 118 is connected to injectors 115 of the four cylinders provided in the diesel engine 70 through a fuel pump 116 and the common rail system 117. Each of the injectors 115 includes an electromagnetic opening/closing control type fuel injection valve 119. The common rail system 117 includes a cylindrical common rail 120 (pressure-accumulation chamber).

As shown in FIGS. 2, 7, and 8, a fuel tank 118 is connected to an intake side of the fuel pump 116 through a fuel filter 121 and a low pressure pipe 122. Fuel in the fuel tank 118 is sucked into the fuel pump 116 through the fuel filter 121 and the low pressure pipe 122. The common rail 120 is connected to a discharge side of the fuel pump 116 through a high pressure pipe 123. A high pressure pipe connector 124 is provided on an intermediate portion of the cylindrical common rail 120 in its longitudinal direction. An end of the high pressure pipe 123 is connected to the high pressure pipe connector 124 by threadedly engaging a high pressure pipe connector nut 125. The injectors 115 for four cylinders are connected to the common rail 120 through four fuel injection pipes 126, respectively. Fuel injection pipe connectors 127 for the four cylinders are provided in a longitudinal direction of the cylindrical common rail 120. Ends of the fuel injection pipes 126 are connected to the fuel injection pipe connectors 127 by threadedly engaging the fuel injection pipe connector nuts 128.

According to the above-described configuration, fuel in the fuel tank 118 is sent to the common rail 120 under pressure by the fuel pump 116, and the high pressure fuel is accumulated in the common rail 120. Opening and closing operations of the fuel injection valves 119 are controlled, and high pressure fuel in the common rail 120 is injected from the injectors 115 to the cylinders of the diesel engine 70. That is, by electronically controlling the fuel injection valves 119, injection pressure, injection timing and injection time (injection amount) of fuel supplied from the injectors 115 are precisely controlled. Hence, it is possible to reduce nitrogen oxide (NOx) discharged from the diesel engine 70 and to reduce noise vibration of the diesel engine 70.

As shown in FIG. 7, a fuel pump 116 is connected to the fuel tank 118 through a pump fuel return pipe 129. A common rail fuel return pipe 131 is connected to an end of the cylindrical common rail 120 in its longitudinal direction through a return-pipe connector 130 having a pressure adjusting valve which limits a pressure of fuel in the common rail 120. Surplus fuel in the fuel pump 116 and surplus fuel in the common rail 120 are collected into the fuel tank 118 through the pump fuel return pipe 129 and the common rail fuel return pipe 131.

(3) Details of Intake System Structure of Diesel Engine

Next, details of the intake system structure of the diesel engine 70 will be described mainly with reference to FIGS. 8 to 11. Intake ports (not shown) leading to the cylinders of the diesel engine 70 open at one side of the diesel engine 70 (left side surface of the cylinder head 72 in this embodiment) which is parallel to the crank axis "a". An intake manifold 73 which distributes mixture gas of new air and EGR gas to the intake ports is mounted on the one side of the diesel engine 70 (see FIGS. 8 to 10).

The intake manifold 73 is formed into a longitudinally long box shape which opens laterally inward. A head-side flange 142 is integrally formed around a laterally inward oriented head-side opening 141. In the embodiment, the head-side flange 142 is fastened to a left side surface of the cylinder head 72 through a plurality of bolts 143. According to this, a flange of the intake manifold 73 is connected to a flange of a left side surface of the cylinder head 72 in a state where the intake manifold 73 lies over the intake ports and is in communication with the intake ports. A seal member (not shown) made of soft material which surround the head-side opening 141 is interposed between the head-side flange 142 and the left side surface of the cylinder head 72. An air-supply intake side opening 144 which is an inlet is formed in a rear side of the lateral outer surface (left side surface) of the intake manifold 73 which is closer to the cooling fan 76. An intake-side flange 145 is integrally formed around the air-supply intake side opening 144.

Figure 9:
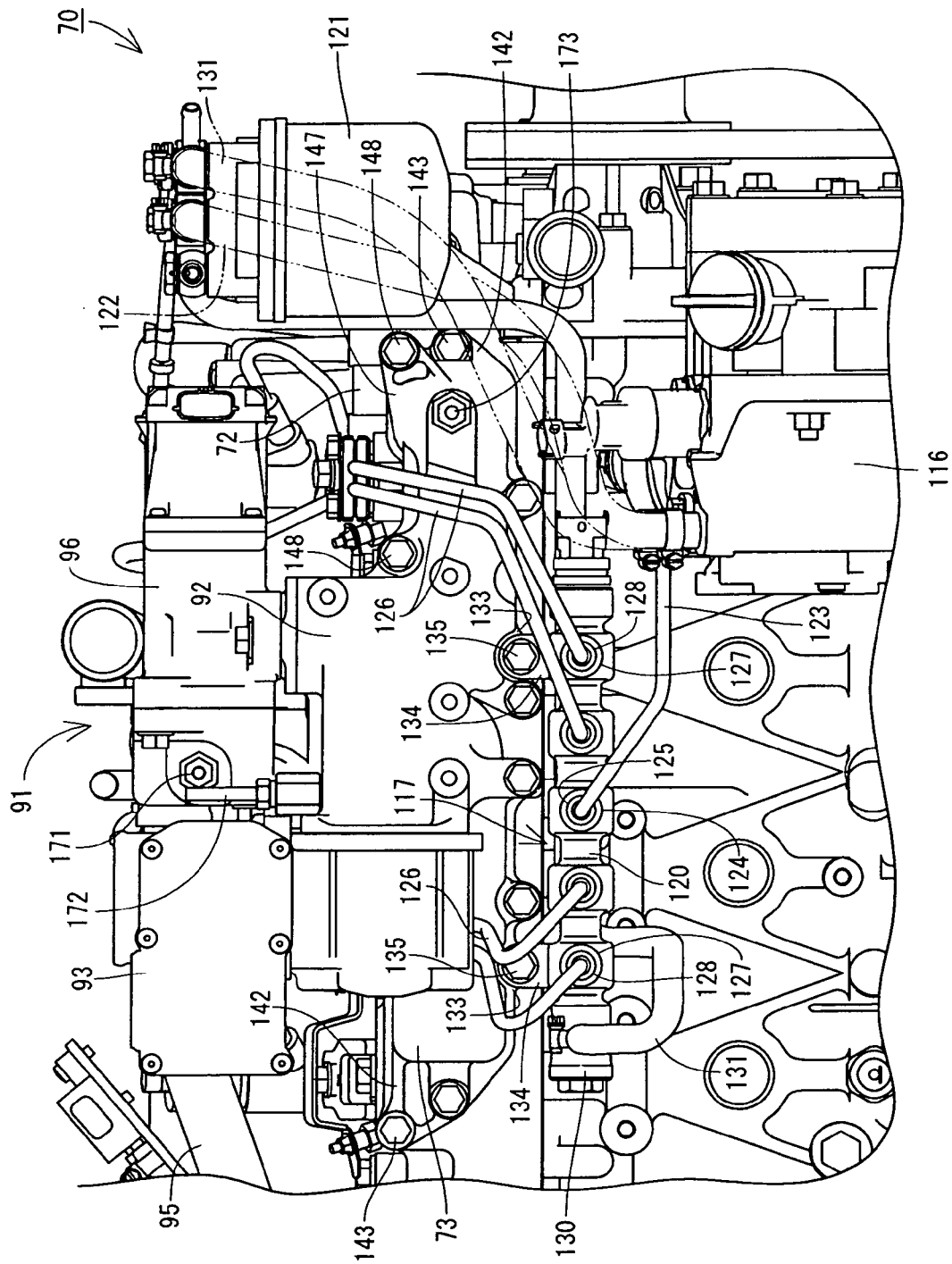
FIG. 9 is an enlarged side view of a periphery of the intake manifold.

As shown in FIGS. 8 and 9, a pair of front and rear fastening stages 133 is integrally formed on a lower surface of the intake manifold 73. Upwardly projecting fastening bosses 134 corresponding to the fastening stages 133 of the intake manifold 73 are integrally formed on the common rail 120. The fastening bosses 134 are fastened to the fastening stages 133 through rail mounting bolts 135 from the laterally outward (left side). According to this, the common rail 120 is detachably suspended from and fixed to the intake manifold 73 in such a manner that the common rail 120 extends along the intake manifold 73. In the embodiment, the common rail 120 is disposed close to a left lower corner of the intake manifold 73. The common rail 120 tilts (lies) around a longitudinal axis such that the high pressure pipe connector 124 and the fuel injection pipe connector 127 provided on the common rail 120 are oriented laterally outward (leftward and outward).

The collector 92 as a relay path configuring the EGR apparatus 91 is located laterally outward (leftward in the embodiment) with respect to the intake manifold 73. As described above, the collector 92 is formed into the longitudinally long substantially cylindrical shape, and is mounted on the laterally outside surface (left side surface) of the intake manifold 73 such that the collector 92 extends along the longitudinal direction of the intake manifold 73. Therefore, the intake manifold 73 and the collector 92 are disposed in a side-by-side relationship.

An air-supply discharge-side opening 146 is formed in a rear portion of a laterally inner side surface (right side surface) of the collector 92 which is closer to the cooling fan 76. A collector-side flange 147 is integrally formed around the air-supply discharge-side opening 146. The collector-side flange 147 is superposed on the intake-side flange 145 of the intake manifold 73 and fastened thereto through a plurality of bolts 148. According to this, a flange of the intake manifold 73 and a flange of the collector 92 are connected to each other in a state where the air-supply intake side opening 144 and the air-supply discharge-side opening 146 are brought into communication with each other. As described above, the intake throttle member 93 is fastened, through a bolt, to a front portion of the collector 92 in the longitudinal direction which is an air-supply intake side.

Figure 11:
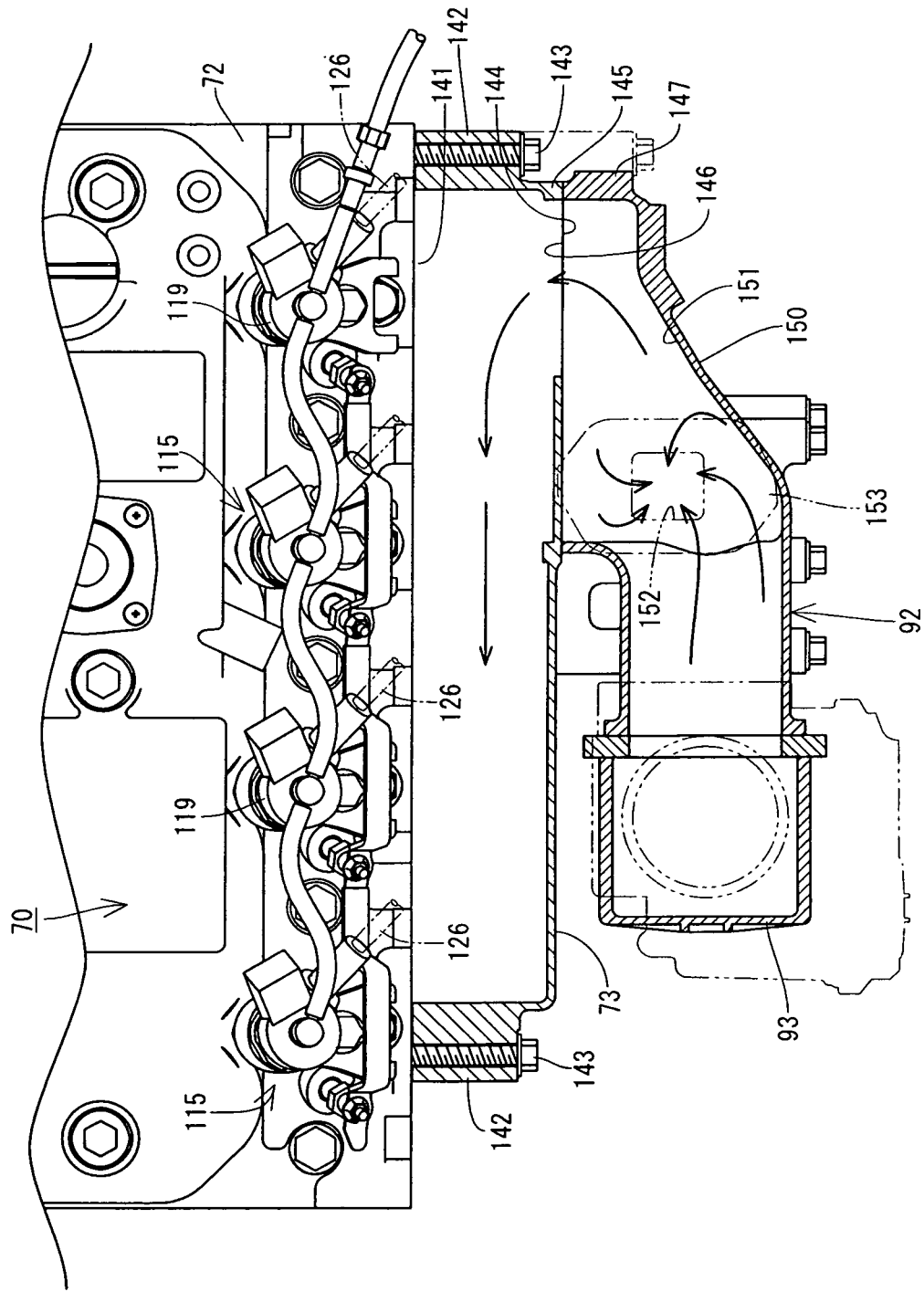
FIG. 11 is a sectional plan view showing a relation between the intake manifold and a collector.

Therefore, as shown in FIG. 11, interiors of the intake manifold 73 and the collector 92 are intake passages which are folded back in U-turn shapes extending from the intake throttle member 93 to the intake ports through a communicated portion between both the openings 144 and 146. A communicated portion between the intake manifold 73 and the collector 92 (which is also a communicated portion of both the openings 144 and 146) is located at a rear portion close to the cooling fan 76. A seal member (not shown) made of soft material surrounding the air-supply intake side opening 144 and the air-supply discharge-side opening 146 is interposed between the intake-side flange 145 and the collector-side flange 147.

Figure 10:
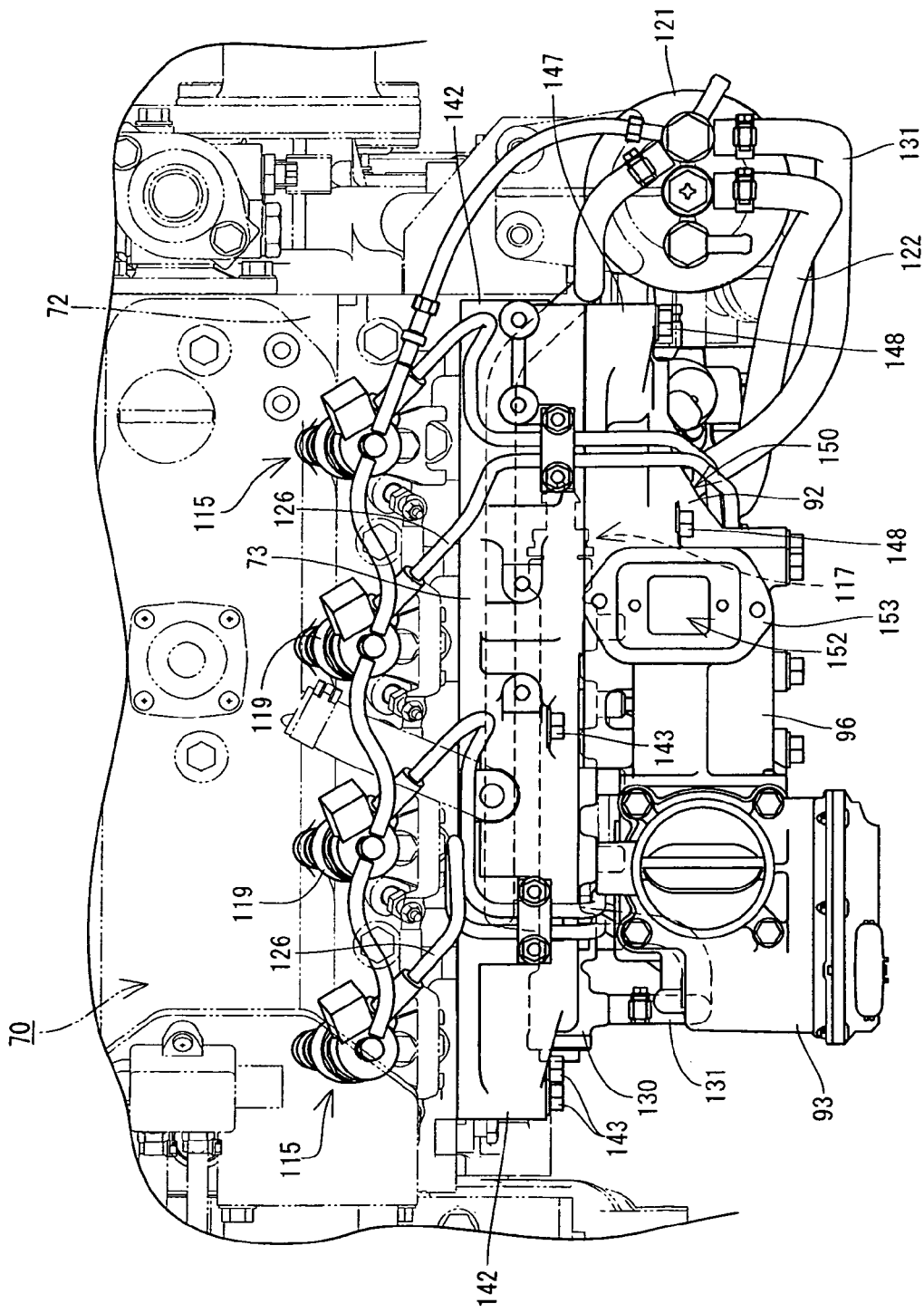
FIG. 10 is an enlarged plan view of the periphery of the intake manifold.

As shown in FIGS. 10 and 11, an inclined portion 150 is formed on a portion of the collector 92 which is closer to the communicated portion. A length of the inclined portion 150 in a direction (lateral direction in the embodiment) intersecting with the crank axis "a" becomes shorter as approaching the intake manifold 73 as viewed from above. In other words, the portion of the collector 92 which is closer to the communicated portion is the inclined portion 150 whose angled portion looks diagonally cut as viewed from above. As shown in FIG. 11, an inclined inner surface 151 of the inclined portion 150 lies over an air-supply intake side passage of the collector 92, a portion of new air flowing in from the intake throttle member 93 and along an inner side surface (left side surface) is made to drift toward a center (closer to midst) by the inclined inner surface 151. A reflux opening 152 is formed in a portion of an upper surface of the collector 92 which is located on the upstream side of the inclined portion 150, and the reflux opening 152 opens upwardly. A valve flange 153 is integrally formed around the reflux opening 152, and an EGR gas discharge side of the EGR valve member 96 is fastened to the valve flange 153 through a bolt.

In the above-described structure, new air flowing from the intake throttle member 93 into the collector 92 flows toward the cooling fan 76 (rearward). A portion of the new air which flows along one of inner side surfaces (left inner side surface) collides against the inclined inner surface 151 of the inclined portion 150 and drifts to a center direction near a lower portion of the reflux opening 152. Hence, near the lower portion of the reflux opening 152, a flow of the new air is disturbed to form a swirl in the counterclockwise direction shown in FIG. 11. Since EGR gas from the reflux exhaust gas pipe 95 flows in from above through the EGR valve member 96 with respect to such a disturbed new air flow, the EGR gas flows into the collector 92 and at the same time, the EGR gas is smoothly mixed with new air which flows inside. Therefore, in the collector 92, the new air and the EGR gas can be stirred and efficiently mixed before they are sent into the intake manifold 73 (EGR gas can smoothly be dispersed in the mixture gas), and it is possible to more reliably suppress variation (unevenness) in the gas mixture state in the collector 92.

The mixture gas mixed near the lower portion of the reflux opening 152 is guided to the air-supply discharge-side opening 146 (communicated portion) along the inclined inner surface 151 of the inclined portion 150, a direction thereof is changed from the air-supply intake side opening 144 toward the flywheel housing 78 (front side), the mixture gas flows through the intake manifold 73 and is distributed to the cylinders of the diesel engine 70. The flowing direction of the mixture gas in the intake manifold 73 becomes one direction flowing from the air-supply intake side opening 144 toward the flywheel housing 78. Hence, it is possible to distribute the mixture gas having less unevenness to the cylinders of the diesel engine 70, and it is possible to remarkably suppress the variation in the amount of EGR gas between the cylinders. As a result, it is possible to suppress the generation of black smoke and to reduce the amount of NOx while excellently maintaining a combustion state of the diesel engine 70. That is, exhaust gas can be purified (cleaned) by reflux of EGR gas without incurring accidental fire in specific one of cylinders.

As apparent from the above description and FIGS. 1, 2, 9, and 10, the engine 70 includes the intake manifold 73 on one side thereof which is parallel to the crank axis "a", the exhaust manifold 71 on the other side of the engine 70, and the EGR apparatus 91 which makes a portion of exhaust gas discharged from the exhaust manifold 71 reflux to the intake manifold 73 as EGR gas. The engine 70 also includes the relay pipe 92 which brings the intake manifold 73 and the new air introducing intake throttle member 93 into communication with each other. The outlet of the reflux pipe 95 extending from the exhaust manifold 71 is in communication with and connected to the relay pipe 92, and the relay pipe 92 is mounted on a laterally outer side of the intake manifold 73 such that the relay pipe 92 extends along the intake manifold 73. Therefore, new air and the EGR gas can be mixed before they are sent to the intake manifold 73, and it is possible to reduce the variation (unevenness) in the gas mixture state. Further, there is an effect that the relay pipe 92 can be located on the laterally outer side of the intake manifold 73, the entire height of the engine 70 can be lowered and the engine 70 can be made compact.

The relay pipe 92 is mounted on the laterally outer side of the intake manifold 73 such that it extends along the intake manifold 73. Hence, the length of the relay pipe 92 can be increased in the longitudinal direction of the intake manifold 73. Therefore, there is an effect that the mixing space of new air and EGR gas is widened, thus the mixing operation between new air and EGR gas is enhanced (it is possible to more efficiently disperse EGR gas into the mixture gas).

As apparent from the above description and FIGS. 1, 2, 9, and 10, the cooling fan 76 is provided on the one side which intersect with the crank axis a, and the communicated portions 144 and 146 between the intake manifold 73 and the relay pipe 92 are formed at locations close to the cooling fan 76. Hence, a flowing direction of mixture gas in the intake manifold 73 becomes one direction. Therefore, mixture gas having less unevenness can be distributed to the cylinders of the engine 70, and it is possible to remarkably suppress the variation in the amount of EGR gas between the cylinders. Since cooling wind from the cooling fan 76 hits the communicated portions 144 and 146 between the intake manifold 73 and the relay pipe 92, this is effective for cooling the mixture gas having less unevenness. As a result, it is possible to suppress the generation of black smoke and to reduce the amount of NOx while excellently maintaining a combustion state of the engine 70. That is, there is an effect that exhaust gas can be purified (cleaned) by reflux of EGR gas without incurring accidental fire in specific one of cylinders.

As apparent from the above description and FIGS. 9 to 11, the inclined portion 150 is formed on the portion of the relay pipe 92 which is closer to the communicated portion, and the length of the inclined portion 150 in the direction intersecting with the crank axis "a" becomes shorter as approaching the intake manifold 73 as viewed from above. The outlet of the reflux pipe 95 is brought into communication with and connected to the portion of the relay pipe 92 which is located on the upstream side of the inclined portion 150. Hence, a portion of new air flowing into the relay pipe 92 which flows along one of the inner side surfaces (left inner side surface) collides against the inner surface of the inclined portion 150, and drifts in the center direction of a portion of the relay pipe 92 which is close to the outlet of the reflux pipe 95. Therefore, a flow of new air is disturbed near the outlet of the reflux pipe 95 in the relay pipe 92 such that the flow forms a swirl. Since EGR gas from the reflux pipe 95 flows into the relay pipe 92 with respect to the disturbed flow of new air, the EGR gas flows into the relay pipe 92 and at the same time, the EGR is smoothly mixed with new air flowing therein. Therefore, in the relay pipe 92, the new air and the EGR gas are stirred and efficiently mixed before they are sent to the intake manifold 73 (EGR gas can smoothly be dispersed in the mixture gas), and there is an effect that it is possible to more reliably suppress variation (unevenness) in the gas mixture state in the relay pipe 92.

(4) Connecting Structure Between Reflux Exhaust Gas Pipe and EGR Valve Member

Next, a connecting structure between the reflux exhaust gas pipe 95 and the EGR valve member 96 will be described mainly with reference to FIGS. 12 to 15. As shown in FIGS. 1, 2, 12 and 13, the EGR valve member 96 is provided above the intake manifold 73. The EGR valve member 96 adjusts a supply amount of EGR gas to the intake manifold 73. In the embodiment, the EGR valve member 96 is disposed on the collector 92 which is located laterally outward (left side in the embodiment) of the intake manifold 73 in such a manner that the EGR valve member 96 extends along the longitudinal direction (longitudinal direction which is parallel to the crank axis "a") of the intake manifold 73. A downwardly opening EGR gas discharge side of the EGR valve member 96 is fastened to the valve flange 153 of the collector 92 through a bolt.

Upper portions of the injectors 115 for the four cylinders upwardly project from portions of an upper surface of the cylinder head 72 which are closer to the intake manifold 73 in a state where the upper portions of the injectors 115 are arranged in the longitudinal direction which is parallel to the crank axis "a". A head cover 160 is mounted on a portion of the upper surface of the cylinder head 72 which is close to the exhaust manifold 71. Therefore, the upper portions of the injectors 115 are not covered with the head cover 160 and are exposed from the cylinder head 72. The EGR valve member 96 and the head cover 160 are raised as compared with upper surfaces of the cylinder head 72 and the intake manifold 73 as viewed from side, e.g., as viewed from the cooling fan 76 side. Therefore, the upper portion (between the EGR valve member 96 and the head cover 160) of the diesel engine 70 is recessed upwardly, and the recessed space (recessed space extending longitudinally between the EGR valve member 96 and the head cover 160) is a ventilation passage 161 through which cooling wind passes from the cooling fan 76 toward the flywheel housing 78.

Figure 12:
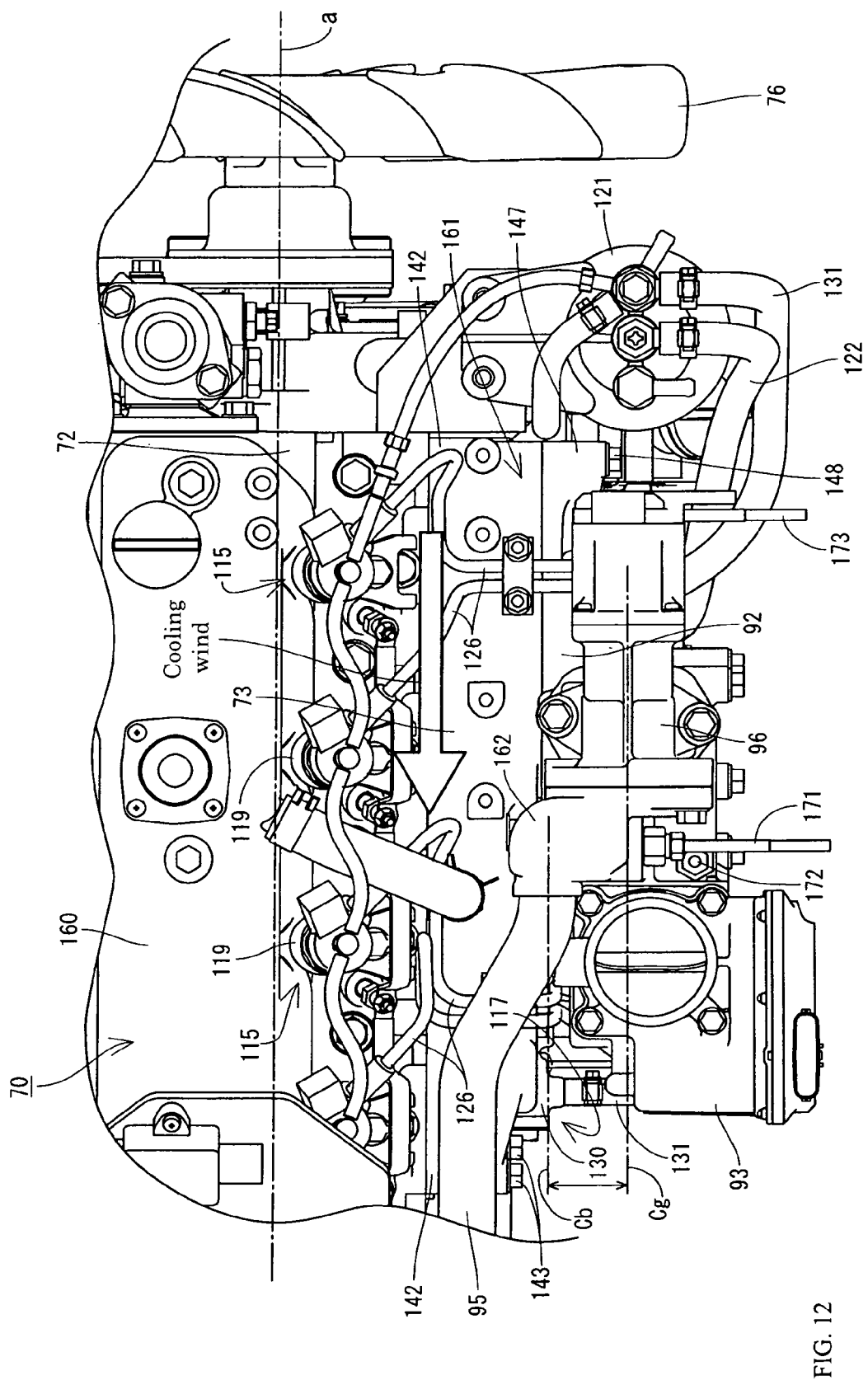
FIG. 12 is an enlarged plan view showing a connection relation between a recirculation exhaust gas pipe and an EGR valve member.
Figure 13:
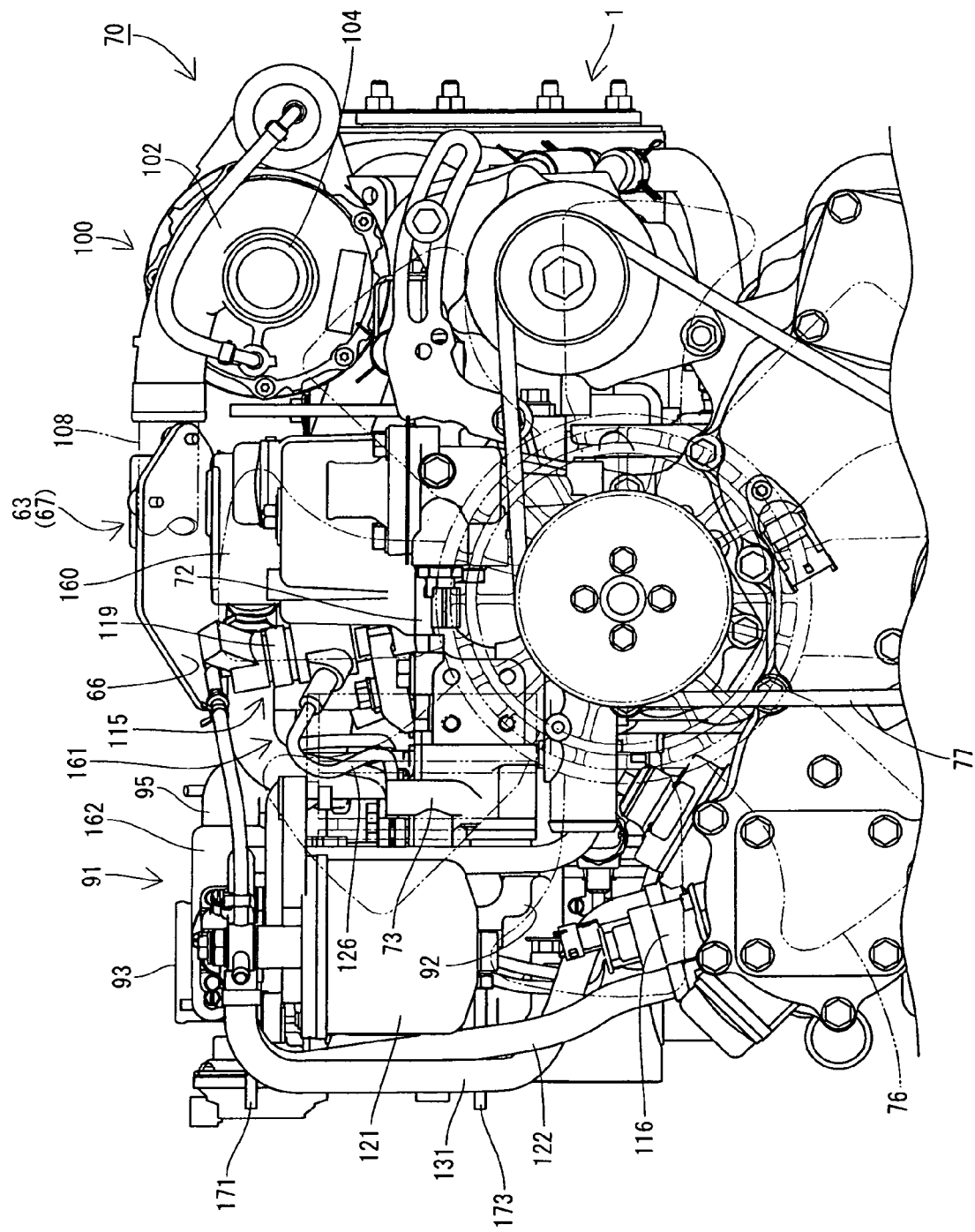
FIG. 13 is an enlarged side view of a ventilation passage on the side of the cooling fan.
Figure 14:
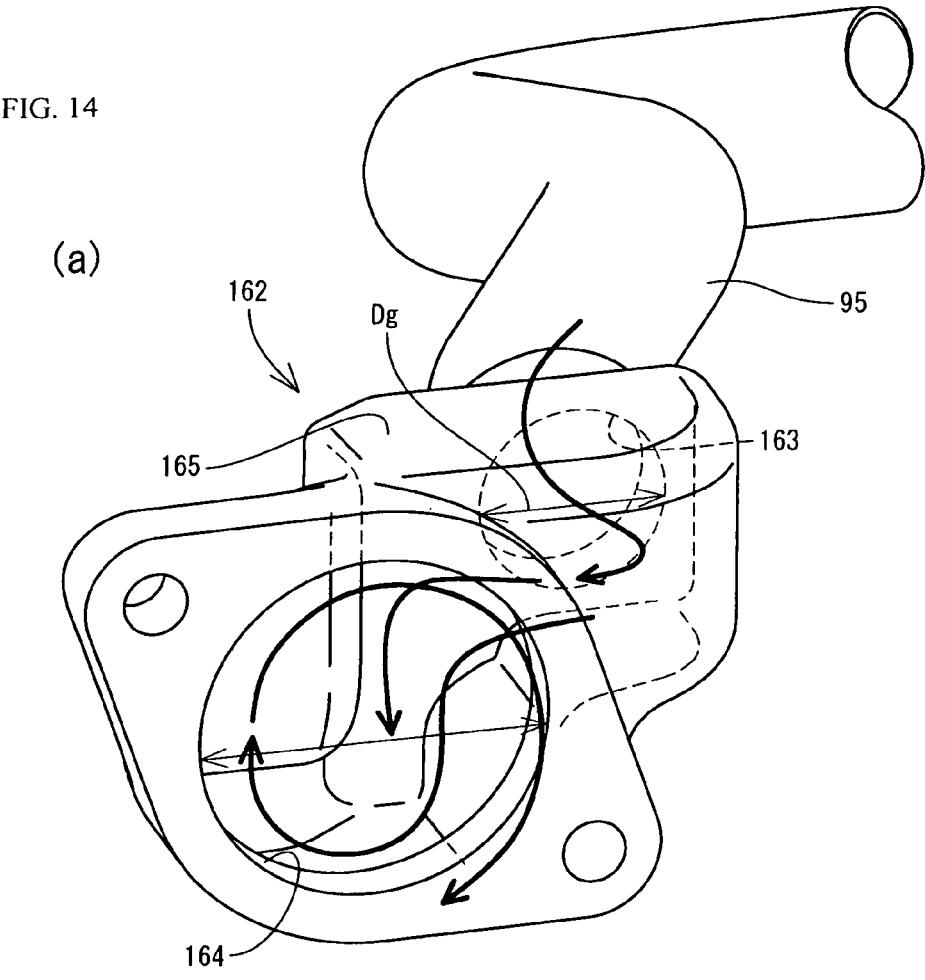
FIG. 14(*a*) is a perspective view of an intermediate joint and FIG. 14(*b*) is a side view of the intermediate joint as viewed from the side of the EGR valve member.
Figure 14:
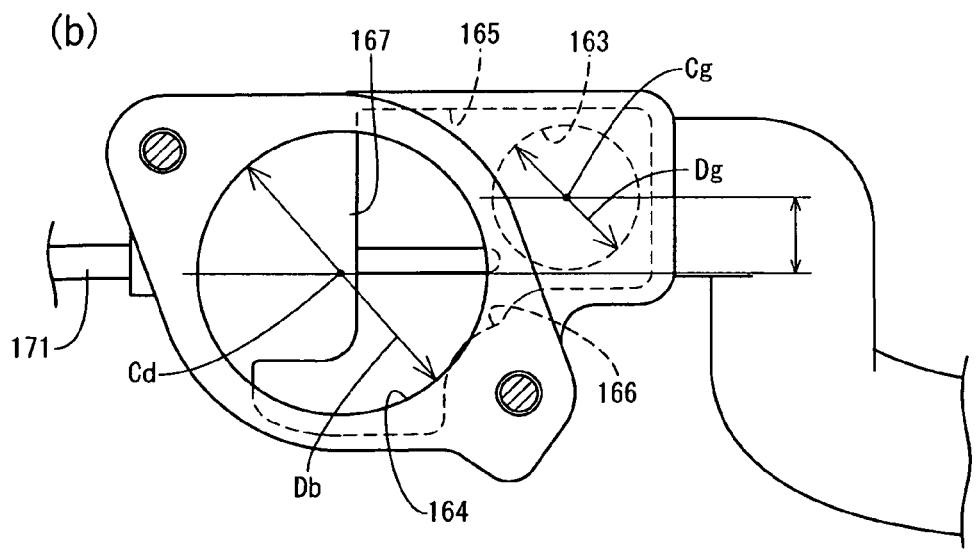
Figure 15:
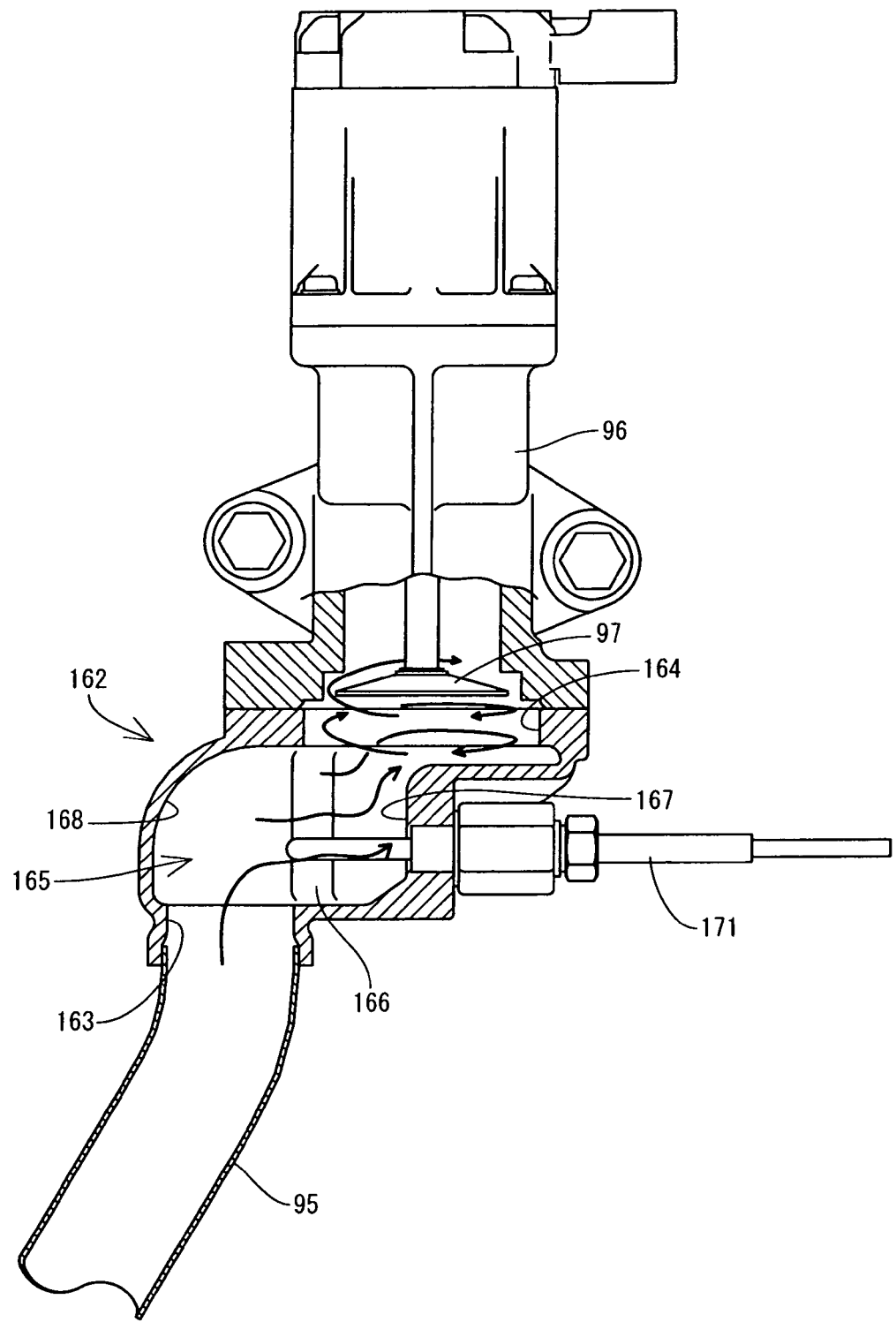
FIG. 15 is a sectional plan view of the intermediate joint.

As shown in FIGS. 12 and 14, the outlet of the reflux exhaust gas pipe 95 as the reflux pipe extending from the exhaust manifold 71 is deviated from the EGR gas intake-side of the EGR valve member 96 so that the outlet of the reflux exhaust gas pipe 95 is located close to the ventilation passage 161 as viewed from above. The outlet of the reflux exhaust gas pipe 95 and the EGR gas intake-side of the EGR valve member 96 are connected to each other through an intermediate joint 162. As shown in FIG. 15, the EGR valve 97 is provided in an opening of the EGR valve member 96 on the EGR gas intake-side, and the EGR valve 97 opens and closes this opening.

As shown in FIGS. 12, 14, and 15, the intermediate joint 162 is formed into a reversed S-shaped cylindrical shape as viewed from above. A diameter Dg of a gas pipe-side opening 163 in the intermediate joint 162 is set smaller than a diameter Db of a valve-side opening 164. A center line Cg of the gas pipe-side opening 163 is deviated upward from a center line Cb of the valve-side opening 164 by an appropriate amount. A step 166 is formed on an intermediate communicated portion 165 of the intermediate joint 162 between the gas pipe-side opening 163 and the valve-side opening 164. The step 166 is lowered in a stepwise form from the gas pipe-side opening 163 toward the valve-side opening 164 due to the diameters Dg and Db of the openings 163 and 164, and the deviated position. A swelling portion 167 is formed in a portion of the intermediate communicated portion 165 of the intermediate joint 162 which is opposed to the step 166, and the swelling portion 167 inwardly projects to lie over the step 166. In the vicinity of the valve-side opening 164 of the intermediate joint 162, EGR gas which flows down from the gas pipe-side opening 163 through the step 166 is made to turn around the center line Cb of the valve-side opening 164 due to existence of the inwardly projecting swelling portion 167, thereby forming a swirl.

In the above-described configuration, EGR gas which flows from the exhaust manifold 71 into the gas pipe-side opening 163 of the intermediate joint 162 through the reflux exhaust gas pipe 95 collides against a curved inner surface 168 of the intermediate communicated portion 165 which is located on the upstream side of the step 166, and the EGR gas flows down toward the step 166. At that time, since the outlet of the reflux exhaust gas pipe 95 is deviated toward the ventilation passage 161 as viewed from above, a periphery (outer periphery) of the curved inner surface 168 of the intermediate joint 162 projects closer to the ventilation passage 161 than the EGR valve member 96, and cooling wind from the cooling fan 76 hits this periphery of the curved inner surface 168. Hence, it is possible to suppress temperature rise of the intermediate joint 162 by the cooling wind, and to lower the EGR gas temperature therein. As a result, there is an effect that the mixture gas can be cooled and it becomes easy to maintain the NOx amount reducing effect caused by the mixture gas in an appropriate state.

The EGR gas which flows down from the gas pipe-side opening 163 through the step 166 turns around the center line Cb near the valve-side opening 164 to form the swirl due to existence of the inwardly projecting swelling portion 167, and the EGR gas is sent into the EGR gas intake-side of the EGR valve member 96. Then, the swirl shaped EGR gas smoothly flows into a gap between the EGR valve 97 and the EGR gas intake-side opening without being blocked by the EGR valve 97 when the EGR valve 97 opens. Therefore, there is an effect that it is possible to smoothly mix new air and EGR gas passing through the EGR valve member 96. This configuration is especially useful when new air is compressed using the turbo supercharger 100 and is supplied to the intake manifold 73, as in the embodiment. The pressure of the compressed air in the intake manifold 73 and the collector 92 makes it difficult for EGR gas to flow into the EGR valve member 96. However by making the EGR gas flow in a swirling manner, the flowing-in difficulty can be cancelled.

In the embodiment, the diameter Dg of the gas pipe-side opening 163 in the intermediate joint 162 is set smaller than the diameter Db of the valve-side opening 164. Hence, a cross sectional area of a path from the gas pipe-side opening 163 to the valve-side opening 164 can be increased in the intermediate communicated portion 165. Therefore, there is a merit that it is possible to avoid increase in flow resistance of EGR gas flowing from the gas pipe-side opening 163 to the valve-side opening 164.

As shown in FIGS. 2, 9, and 12, an EGR gas temperature sensor 171 is mounted on a portion of the intermediate joint 162 which is located on the upstream side of the swelling portion 167 (on the side of the outer surface near the gas pipe-side opening 163 in the embodiment), and the EGR gas temperature sensor 171 detects a temperature of EGR gas which flows into the intermediate joint 162. A new air temperature sensor 172 which detects a temperature of new air is mounted on a portion of the collector 92 which is closer to the intake throttle member 93. A mixture gas temperature sensor 173 which detects a temperature of mixture gas is mounted on the inclined portion 150 of the collector 92. These temperature sensors 171 to 173 are used for obtaining an EGR ratio of mixture gas. Here, the EGR ratio is a value obtained by dividing an EGR gas amount by a sum of the EGR gas amount and a new air amount (=EGR gas amount/(EGR gas amount+ new air amount).

In this case, it is possible to easily and precisely calculate the EGR ratio using the new air temperature, the EGR gas temperature, and the mixture gas temperature even if there is no means (sensor) for detecting a flow rate and flow velocity of each gas. If a configuration for feedback controlling the EGR valve member 96 based on the calculation results, it is possible to supply an appropriate amount of EGR gas to the collector 92 even without constructing a complicated control system for detecting the flow rate and flow velocity of each gas to obtain the EGR ratio.

Further, since the EGR gas temperature sensor 171 is mounted on the portion of the intermediate joint 162 which is located on the upstream side of the swelling portion 167, the EGR gas temperature sensor 171 is located at a position where the flow velocity is relatively fast before the gas flows into the EGR valve member 96. Hence, there is an effect that it is possible to avoid a case where the EGR gas temperature sensor 171 is contaminated by EGR gas and performance of the EGR gas temperature sensor 171 is deteriorated. Further, since the temperature of EGR gas is measured at a location where new air cannot be mixed, there is a merit that it is possible to precisely measure EGR gas temperature.

As apparent from the above description and FIGS. 12 to 15, the engine 70 includes the intake manifold 73 on the one side of the cylinder head 72 which is parallel to the crank axis "a", the exhaust manifold 71 on the other side, and the EGR apparatus 91 which refluxes a portion of exhaust gas discharged from the exhaust manifold 71 to the intake manifold 73 as EGR gas. The space between the EGR valve member 96 disposed above the intake manifold 73 and the head cover 160 on the cylinder head 72 is the ventilation passage 161 through which cooling wind from the cooling fan 76 passes. The outlet of the reflux pipe 95 extending from the exhaust manifold 71 is deviated with respect to the EGR valve member 96 such that the outlet of the reflux pipe 95 is located close to the ventilation passage 161 as viewed from above. The outlet of the reflux exhaust gas pipe 95 and the EGR gas intake side of the EGR valve member 96 are connected to each other through the intermediate joint 162. Therefore, cooling wind from the cooling fan 76 hits the portion of the intermediate joint 162 which is close to the ventilation passage 161. Hence, it is possible to suppress temperature rise of the intermediate joint 162 by the cooling wind, and to lower the EGR gas temperature therein. As a result, there is an effect that the mixture gas can be cooled and it becomes easy to maintain the NOx amount reducing effect caused by the mixture gas in an appropriate state.

As apparent from the above description and FIGS. 14 and 15, the swelling portion 167 for making EGR gas turn around the center line Cb of the EGR gas discharge side is formed in a portion of the intermediate joint 162 which is in the EGR gas discharge side. Hence, EGR gas which flows from the EGR gas intake side 163 turns around the center line Cb near the EGR gas discharge side 164 and forms a swirl flow due to existence of the inwardly projecting swelling portion 167, and the EGR gas is sent into the EGR gas intake side of the EGR valve member 96. Then, the swirl shaped EGR gas smoothly flows into a gap between the opening of the EGR valve member 96 on the EGR gas intake side and the EGR valve 97 without being blocked by the EGR valve 97 when the EGR valve 97 opens. Therefore, there is an effect that it is possible to smoothly mix new air and EGR gas passing through the EGR valve member 96.

As apparent from the above description and FIGS. 12, 14, and 15, the EGR gas temperature sensor 171 which detects a temperature of EGR gas is mounted on a portion of the intermediate joint 162 which is on the upstream side of the swelling portion 167. Hence, the EGR gas temperature sensor 171 is located at a position where the flow velocity is relatively fast before the gas flows into the EGR valve member 96. Therefore, there is an effect that it is possible to avoid a case where the EGR gas temperature sensor 171 is contaminated by EGR gas and performance of the EGR gas temperature sensor 171 is deteriorated. Further, since the temperature of EGR gas is measured at a location where new air cannot be mixed, there is a merit that it is possible to precisely measure EGR gas temperature.

(5) Details of Layout Structure of Common Rail System

Next, details of the layout structure of the common rail system 117 will be described with reference to FIGS. 8, 9, 13, and 16 to 19. As shown in FIGS. 8, 9, 13, and 16 to 19, the fuel pump 116 is disposed on a left side surface of the engine block 75 on the side of the intake manifold 73 at a location below the intake manifold 73 and closer to the cooling fan 76. The fuel pump 116 supplies high pressure fuel to the common rail 120. The fuel pump 116 includes a feed pump 177 which sucks fuel in the fuel tank 118, an amount-adjusting valve 178 which adjusts a fuel sucking amount of the feed pump 177, and a plunger 179 which pressurizes fuel passing through the amount-adjusting valve 178 and supplies the fuel to the common rail 120. The feed pump 177 is driven by rotation and driving operations of the crankshaft 74, and fuel in the fuel tank 118 is sucked through the fuel filter 121. The rotation and driving operations of the crankshaft 74 makes the plunger 179 reciprocate, fuel passing through the amount-adjusting valve 178 is pressurized, and then the fuel is sent to the common rail 120 under pressure.

As shown in FIGS. 16 to 19, the feed pump 177 is disposed on a front side surface of the fuel pump 116 at a location closer to the flywheel housing 78. An upper portion of the amount-adjusting valve 178 and an upper portion of the plunger 179 upwardly project from an upper portion of the fuel pump 116. In the embodiment, the plunger 179 is located on a laterally inner side (right side, on the side of the engine block 75) and the amount-adjusting valve 178 is located on a laterally outer side (left side) as viewed in a direction of the crank axis "a". The upper portions of the amount-adjusting valve 178 and the plunger 179 are arranged in a V-shape on the upper portion of the fuel pump 116 as viewed in the direction of the crank axis "a". Therefore, a V-shaped dead space exists between the upper portion of the amount-adjusting valve 178 and the upper portion of the plunger 179.

As shown in FIGS. 8, 9 and 16 to 19, the common rail 120 is mounted directly on the intake manifold 73 such that the common rail 120 is located diagonally below (leftward and outward of) the intake manifold 73. In the embodiment, a pair of front and rear fastening stages 133 is integrally formed on a lower surface of the intake manifold 73 independently from the head-side flange 142. Upwardly projecting fastening bosses 134 corresponding to the fastening stages 133 are integrally formed on the common rail 120. The fastening bosses 134 are fastened to the fastening stages 133 by the rail mounting bolts 135 from laterally outward (leftward), and the common rail 120 is detachably suspended from and fixed to the intake manifold 73 in such a manner the common rail 120 extends along the intake manifold 73. In this case, the common rail 120 is close to a left and lower corner of the intake manifold 73. Therefore, the common rail 120 is opposed to one side surface (left side surface) of the engine block 75 at an appropriate distance ΔL from each other. In other words, the common rail 120 is laterally outwardly separated from the one side surface (left side surface) of the engine block 75 by the appropriate distance ΔL.

As shown in FIGS. 8, 9, and 16 to 19, the common rail 120 tilts (lies) around a longitudinal axis such that the high pressure pipe connector 124 and the fuel injection pipe connector 127 provided on the common rail 120 are oriented laterally outward (leftward and outward). The high pressure pipe connector 124 and the fuel injection pipe connectors 127 for the four cylinders are arranged in the longitudinal direction at the same pitch P from one another. In the embodiment, the high pressure pipe connector 124 is disposed at a longitudinally central portion of the common rail 120. Two fuel injection pipe connectors 127 are disposed on each of both sides of the high pressure pipe connector 124. One of the fastening bosses 134 upwardly projects from a foremost end of the common rail 120 (end on the side of the return-pipe connector 130) at a location of the fuel injection pipe connector 127. The other fastening boss 134 upwardly projects from a rearmost fuel injection pipe connector 127.

As described above, the common rail 120 is detachably suspended from and fixed to the intake manifold 73 in such a manner that the common rail 120 extends along the intake manifold 73. A layout relation between the fuel pump 116 and the common rail 120 is set such that longitudinally one end (rear end) of the common rail 120 is located between the plunger 179 and the amount-adjusting valve 178 on the fuel pump 116 as viewed from the direction of the crank axis "a" (see FIGS. 13 and 17). That is, the longitudinally one end (rear end) of the common rail 120 is located in a dead space 180 between the upper portion of the amount-adjusting valve 178 and the upper portion of the plunger 179 (the rear end of the common rail 120 is opposed to the dead space 180).

In the meantime, the collector 92 configuring the EGR apparatus 91 is mounted on the laterally outer surface (left side surface) of the intake manifold 73 so that the collector 92 extends along the longitudinal direction of the intake manifold 73 as described above (see FIGS. 8 to 10). The common rail 120 is located at a leftward, outward and diagonally lower position of the intake manifold 73, and the fuel injection pipe connectors 127 project laterally outward (leftward and outward). Fuel inlets of the fuel injection pipes 126 are connected to the laterally outwardly oriented corresponding fuel injection pipe connectors 127 by threadedly engaging the fuel injection pipe connector nuts 128. Fuel outlets of the fuel injection pipes 126 are connected to the corresponding injectors 115. The fuel injection pipes 126 are curved along the outward shape of the collector 92 or the intake manifold 73.

In the following description of FIG. 16, the fuel injection pipes 126 are called a first fuel injection pipe, a second fuel injection pipe ... in the arranged order rearward from one of fuel injection pipes 126 located on the side of the flywheel housing 78 of the diesel engine 70 (front side), and alphabets corresponding to the arranged order are added to the symbols (e.g., a symbol of the first fuel injection pipe is 126a, and a symbol of the second fuel injection pipe is 126b).

Figure 16:
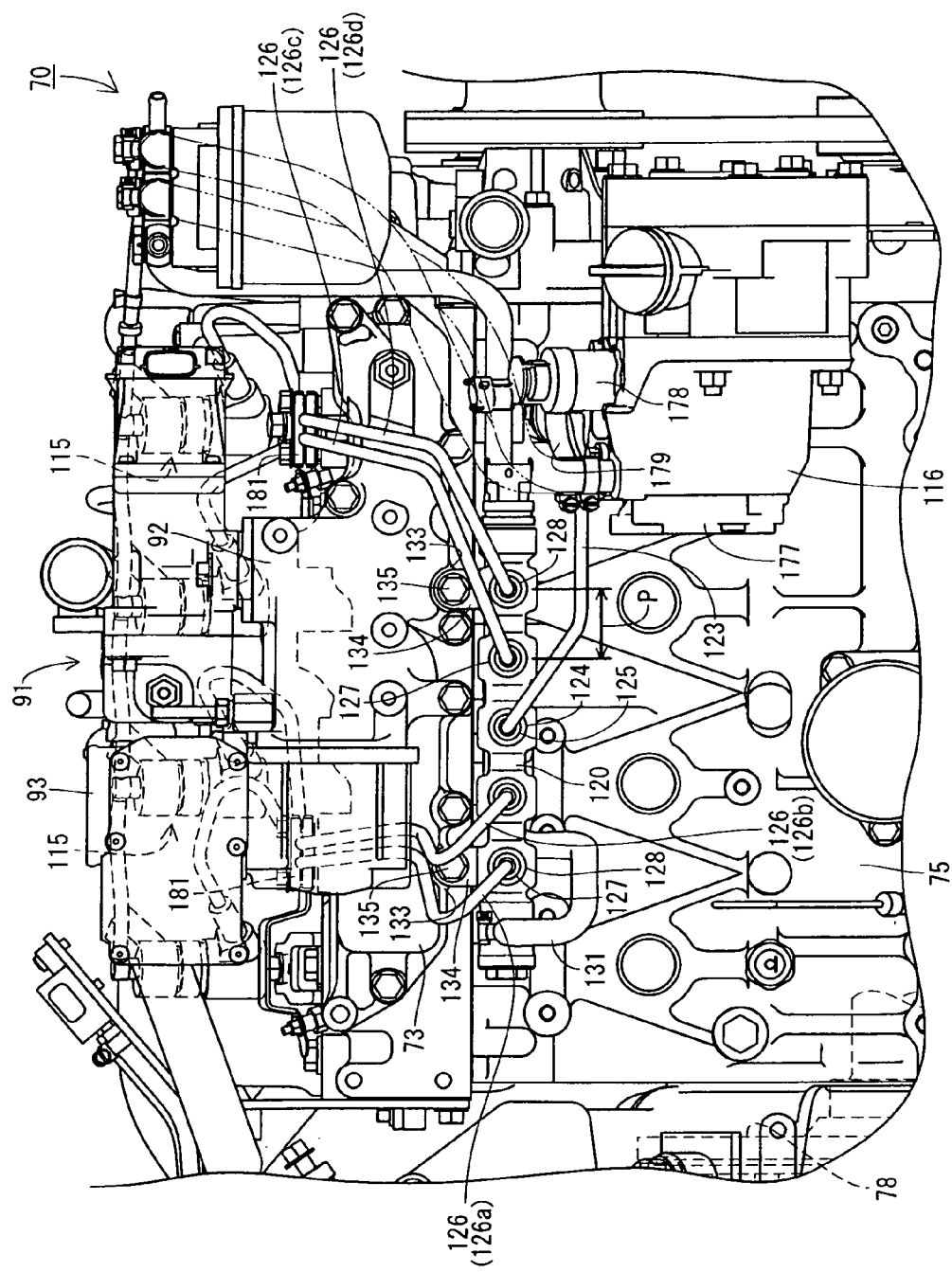
FIG. 16 is an enlarged side view of an essential portion showing a relation between a common rail and the collector as viewed from the side of the intake manifold.
Figure 17:
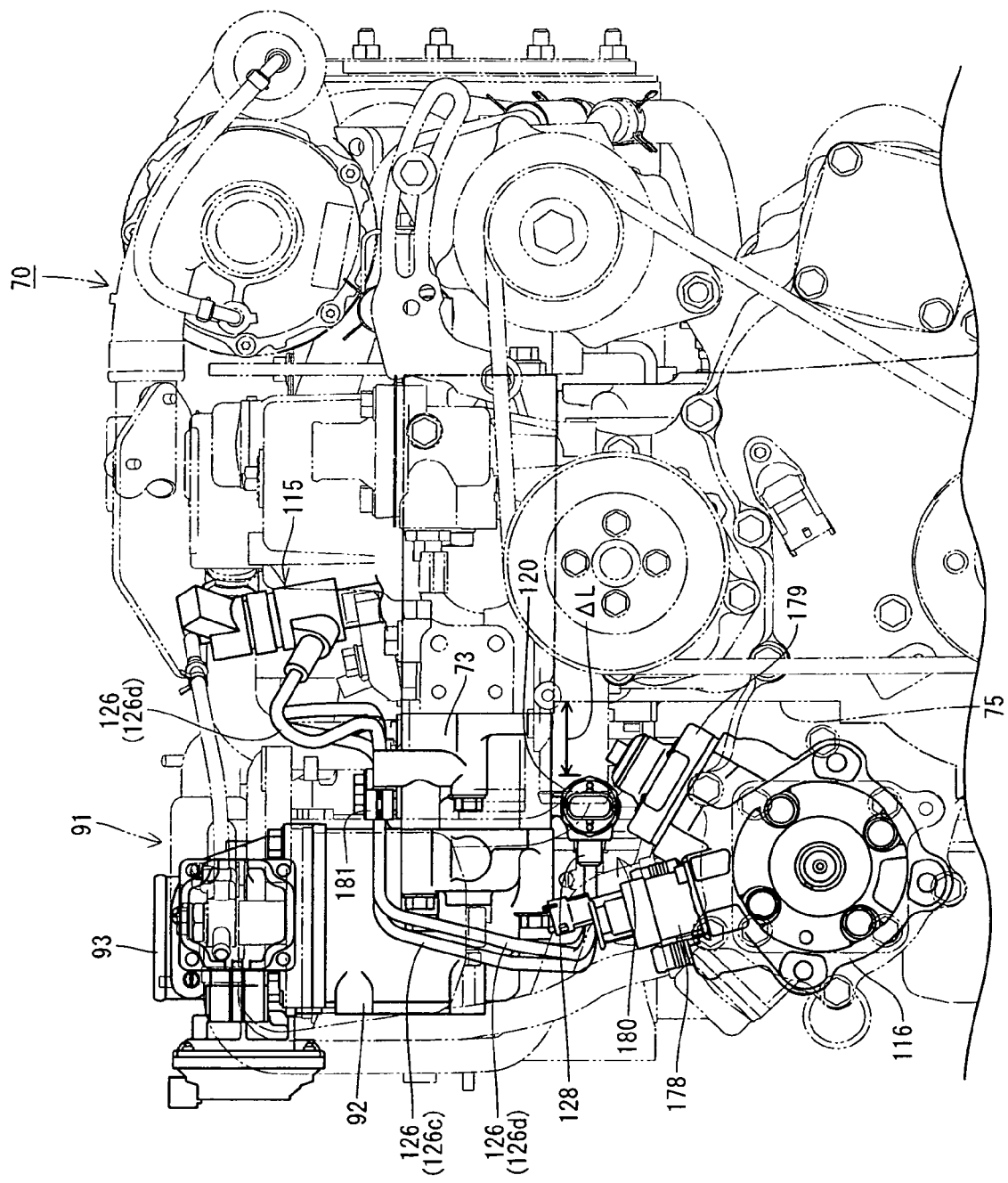
FIG. 17 is an enlarged side view of an essential portion showing a relation between the common rail and a fuel pump as viewed from the side of the cooling fan.
Figure 18:
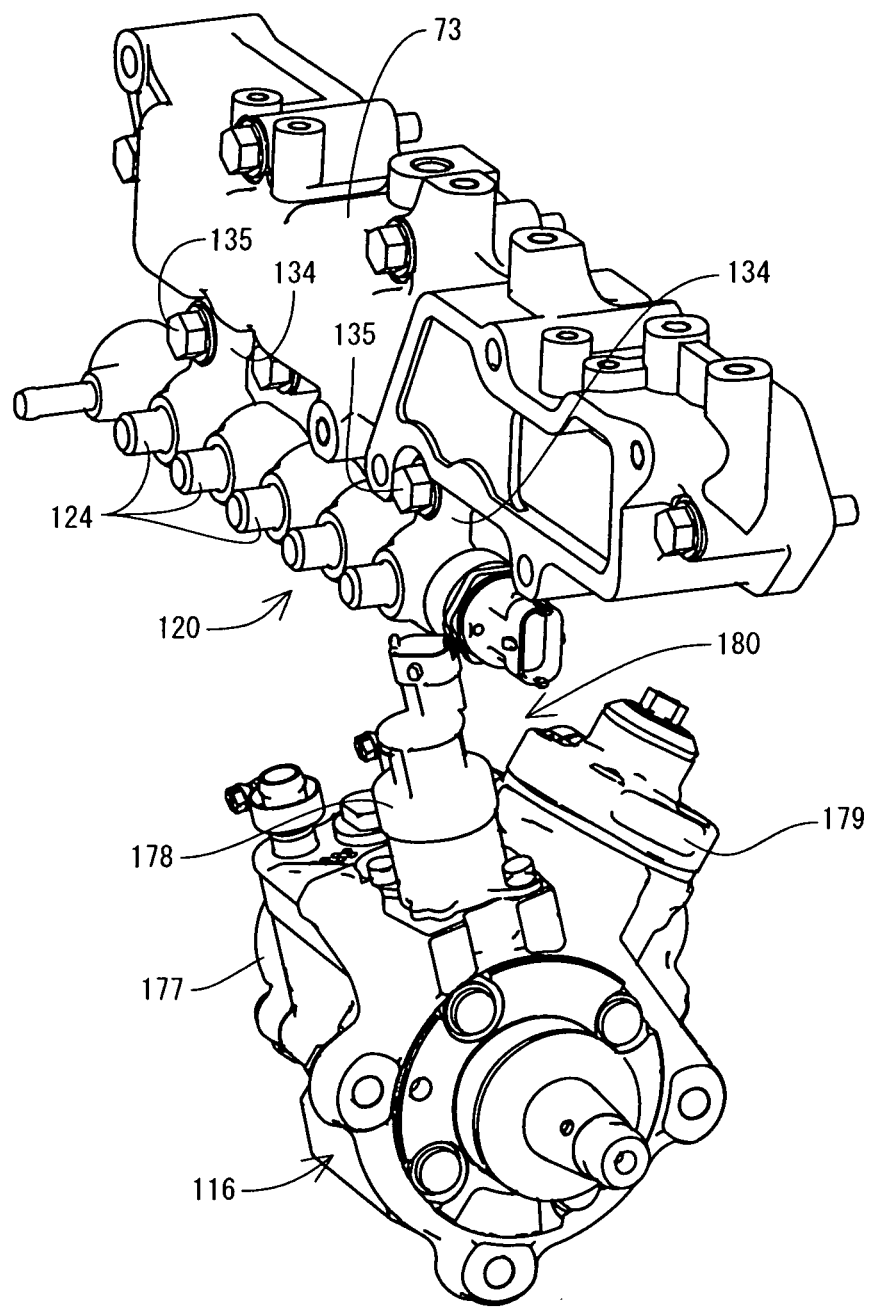
FIG. 18 is a schematic perspective view showing a relation between the common rail, the intake manifold, and a fuel injection pump.
Figure 19:
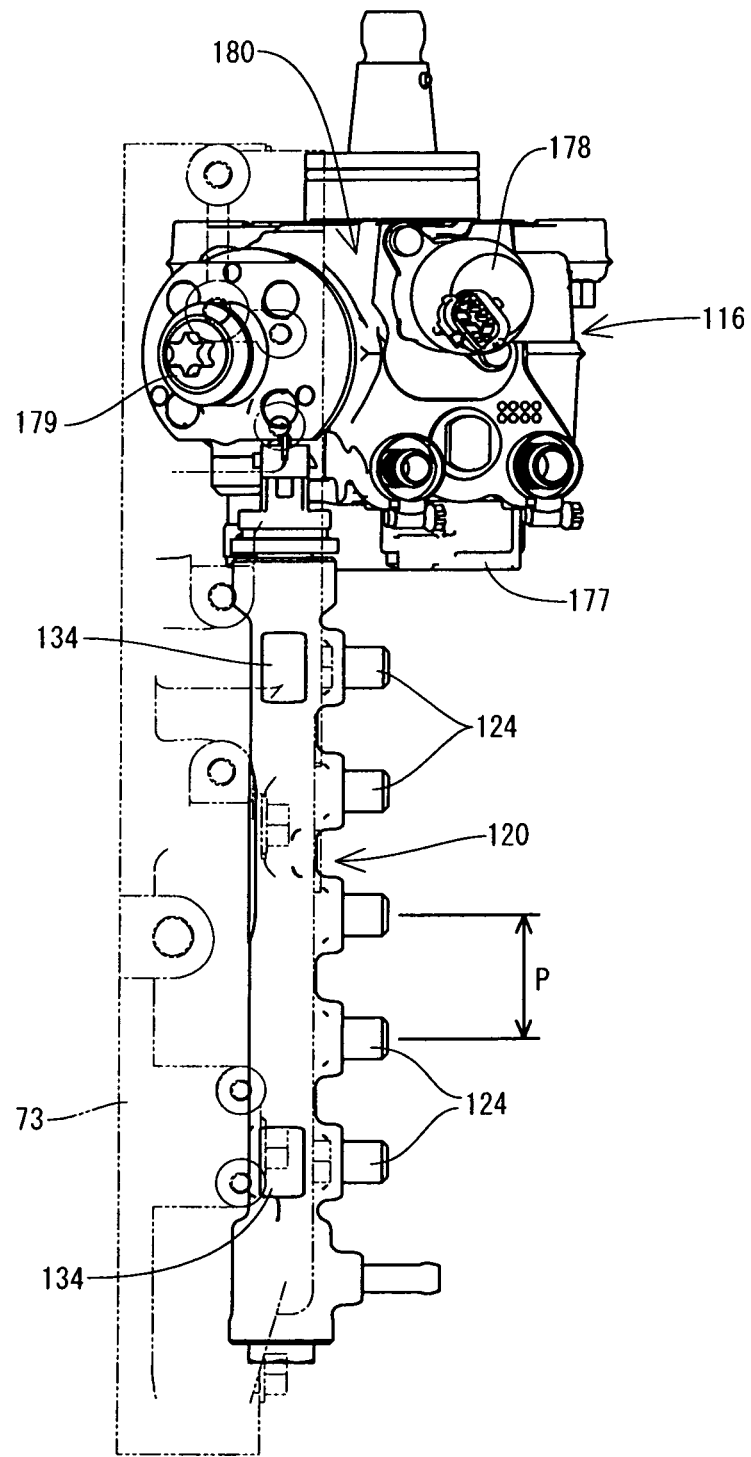
FIG. 19 is a schematic plan view showing a relation between the common rail and the fuel injection pump.

As shown in FIG. 16, the first and second fuel injection pipes 126a and 126b are curved along the outward shape of the intake manifold 73. In this case, intermediate portions of the first and second fuel injection pipes 126a and 126b pass through a gap between the intake manifold 73 and the intake throttle member 93. Portions of the first and second fuel injection pipes 126a and 126b which are located on the intake manifold 73 are collectively fastened on the upper surface of the intake manifold 73 by means of a bolt through a metal clamp 181. Third and fourth fuel injection pipes 126c and 126d are curved along the outward shape of the collector 92 (near the inclined portion 150). Portions of the third and fourth fuel injection pipes 126c and 126d which are located on the intake manifold 73 are also collectively fastened to the upper surface of the intake manifold 73 by means of a bolt through another metal clamp 181. All of the fuel injection pipes 126 are curved along the outward shape of the collector 92 or the intake manifold 73 so that their lengths are equalized to each other.

As apparent from the above description and FIGS. 16 to 19, according to the engine 70, the common rail 120 is disposed on the one side of the engine block 75 such that the common rail 120 is close to the intake manifold 73. The common rail 120 is mounted directly on the intake manifold 73 such that it is located outward and diagonally below the intake manifold 73, and the common rail 120 is opposed to one side surface of the engine block 75 at an appropriate distance from each other. Hence, the common rail 120 can be strongly supported by the intake manifold 73 which is a rigid member. Since the common rail 120 is separated from the one side surface of the engine block 75, there is an effect that it is possible to prevent the common rail 120 from being influenced by combustion heat of the engine 70, and to prevent the common rail 120 from being damaged by overheating.

As apparent from the above description and FIGS. 16 to 19, the common rail 120 is suspended from and fixed to the intake manifold 73 by bolts 135 extending from outside in the lateral direction in such a manner that the common rail 120 extends along the longitudinal direction of the intake manifold 73 and the fuel injection pipe connector 126 provided on the common rail 73 is oriented laterally outward. Therefore, it is possible to easily mount and detach the common rail 120 to and from the intake manifold 73 (fastening and unfastening operation of bolts 135 can easily be carried out). Further, it is easy to carry out the nut-threadedly engaging operation for connecting the fuel injection pipe 126 to the fuel injection pipe connector 127. That is, there is an effect that the mounting and detaching performance of the common rail 120 and its pipings can be enhanced.

As apparent from the above description and FIGS. 16 to 19, the fuel pump 116 which supplies high pressure fuel to the common rail 120 is disposed below the intake manifold 73, and the layout relation between the fuel pump 116 and the common rail 120 is set such that the one end of the common rail 120 is located between the plunger 179 and the amount-adjusting valve 178 which upwardly projects from the upper portion of the fuel pump 116. Therefore, the fuel pump 116 and the common rail 120 can be disposed as close as possible utilizing the dead space 180 formed between the upper portion of the amount-adjusting valve 178 and the upper portion of the plunger 179. Hence, there is an effect that the layout relation between the fuel pump 116, the common rail 120 and the intake manifold 73 (layout relation of the common rail system) can be made compact, and a constraint of members to be provided in an engine can be reduced. For example, the common rail 120 can be provided in a small engine.

As apparent from the above description and FIGS. 16 to 19, the exhaust gas purification device includes the EGR apparatus 91 which refluxes a portion of exhaust gas discharged from the exhaust manifold 71 to the intake manifold 73 as EGR gas, and the relay pipe 92 which brings the intake throttle member 93 and the intake manifold 73 into communication with each other. The intake throttle member 93 adjusts the air-intake amount. The relay pipe 92 is mounted on the laterally outer side of the intake manifold 73 such that the relay pipe 92 extends along the intake manifold 73. The fuel injection pipes 126 which connect the common rail 120 and the injectors 115 to each other are curved along the outward shape of the relay pipe 92 or the intake manifold 73. Hence, since the fuel injection pipes 126 are curved along the outward shape of the relay pipe 92 or the intake manifold 73, their curving angles of the fuel injection pipes 126 can be increased. Therefore, there is an effect that it is possible to reduce the piping resistance of high pressure fuel supplied to the injector 115 and to enhance the performance of the engine 70.

(6) Layout Mode of Common Rail System Between Engines Having Different Numbers of Cylinders A layout mode of the common rail system 117 between engines 70 and 70' having different numbers of cylinders will be described with reference to FIGS. 16, and 20 to 22. The diesel engine 70 shown in FIG. 16 has four cylinders but the diesel engine 70' shown in FIG. 20 has three cylinders. An outstanding difference between these diesel engines 70 and 70' is that concerning longitudinal lengths of engine blocks 75 and 75' and cylinder heads 72 and 72' in the direction of the crank axis "a", the lengths of the three-cylinder diesel engine 70 are shorter by an amount corresponding to one cylinder. According to this, the longitudinal length of an intake manifold 73' of the three-cylinder diesel engine 70' in the direction of the crank axis "a" is also shorter than that the four-cylinder diesel engine 70. In the following description, a configuration of the common rail system 117 is basically common in the four-cylinder diesel engine 70 and the three-cylinder diesel engine 70', the same symbols as those of the above-described four-cylinder diesel engine 70 are used.

Figure 20:
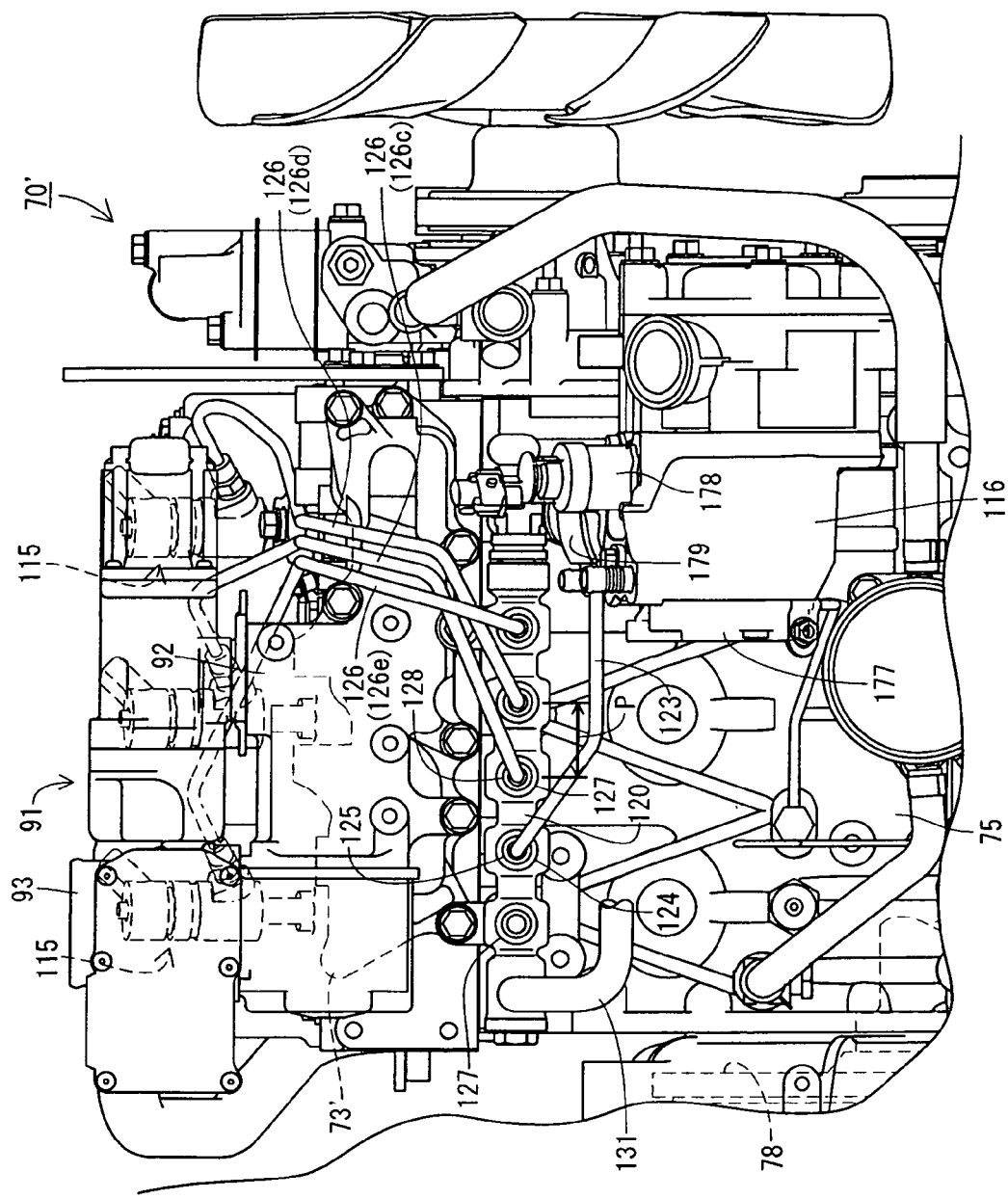
FIG. 20 is an enlarged side view of an essential portion showing a relation between the common rail and the collector in a three-cylinder diesel engine as viewed from the side of the intake manifold.
Figure 21:
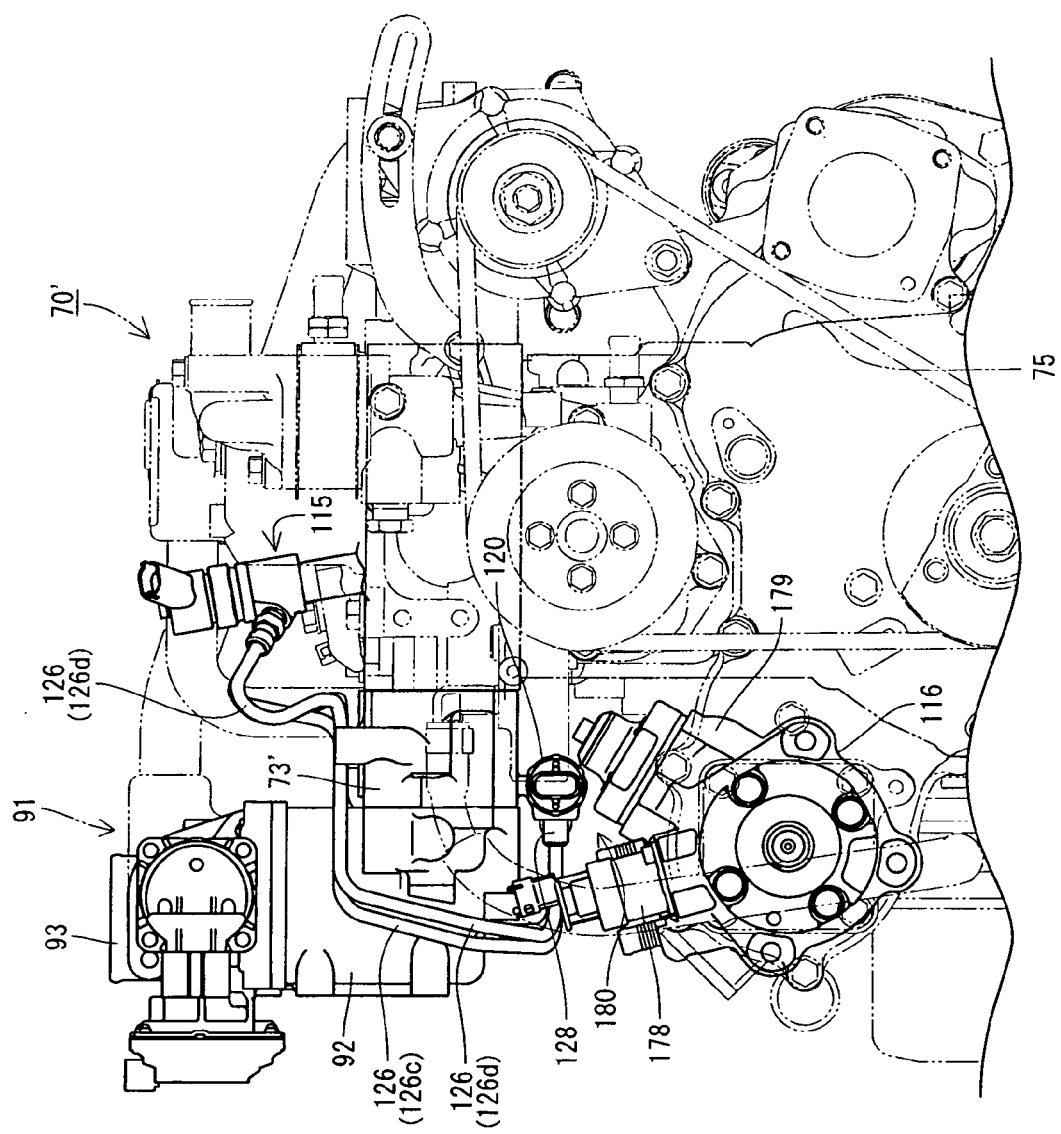
FIG. 21 is an enlarged side view of an essential portion showing a relation between the common rail and the fuel pump in the three-cylinder diesel engine as viewed from the side of the cooling fan.

Compared the four-cylinder diesel engine 70 shown in FIG. 16 with the three-cylinder diesel engine 70' shown in FIG. 20, a positional relation of the common rail 120 with respect to the fuel pump 116 of the three-cylinder diesel engine 70' is deviated by arrangement pitch P of the connectors 124 and 127 as compared with the four-cylinder diesel engine 70 so that the common rail 120 approaches the fuel pump. Therefore, as shown in FIGS. 20 and 21, in the case of the three-cylinder diesel engine 70', one end (rear end) of the common rail 120 in the longitudinal direction is in the dead space 180 between the plunger 179 and the amount-adjusting valve 178 on the fuel pump 116. In the case of the three-cylinder diesel engine 70', the foremost fuel injection pipe connector 127 in the common rail 120 is closed. A second connector from the front is set as a high pressure pipe connector 124. Remaining three fuel injection pipe connectors 127 are connected to injectors 115 for three cylinders through the fuel injection pipes 126.

Here, the third and fourth fuel injection pipe 126c and 126d used in the four-cylinder diesel engine 70 are also used in the three-cylinder diesel engine 70'. In other words, the positional relation of the common rail 120 with respect to the fuel pump 116 is deviated by the pitch P of the groups of connectors 124 and 127. Thus at least the plurality of fuel injection pipes 126c and 126d connected to the groups of connectors 124 and 127 are common parts between the plurality of diesel engines 70 and 70' having the different numbers of cylinders without changing their curved shapes.

That is, the third fuel injection pipe 126c connects the middle injector 115 of the three-cylinder diesel engine 70' and the central fuel injection pipe connector 127 of the common rail 120 in the longitudinal direction to each other. The fourth fuel injection pipe 126d connects the injector 115 on the side of the cooling fan 76 of the three-cylinder diesel engine 70' and fourth fuel injection pipe connector 127 of the common rail 120 from front to each other. The high pressure pipe 123 used for the four-cylinder diesel engine 70 is also used for the three-cylinder diesel engine 70' as a common part whose curved shape is not changed. In this case, the fuel pump 116 and the second high pressure pipe connector 124 of the common rail 120 from front are connected to each other through the high pressure pipe 123. The fuel injection pipe 126e which connects the injector 115 of the three-cylinder diesel engine 70' on the side of the flywheel housing 78 and the rearmost end fuel injection pipe connector 127 of the common rail 120 to each other is a fuel injection pipe having a curved shape for the three-cylinder diesel engine 70' only.

Figure 22:
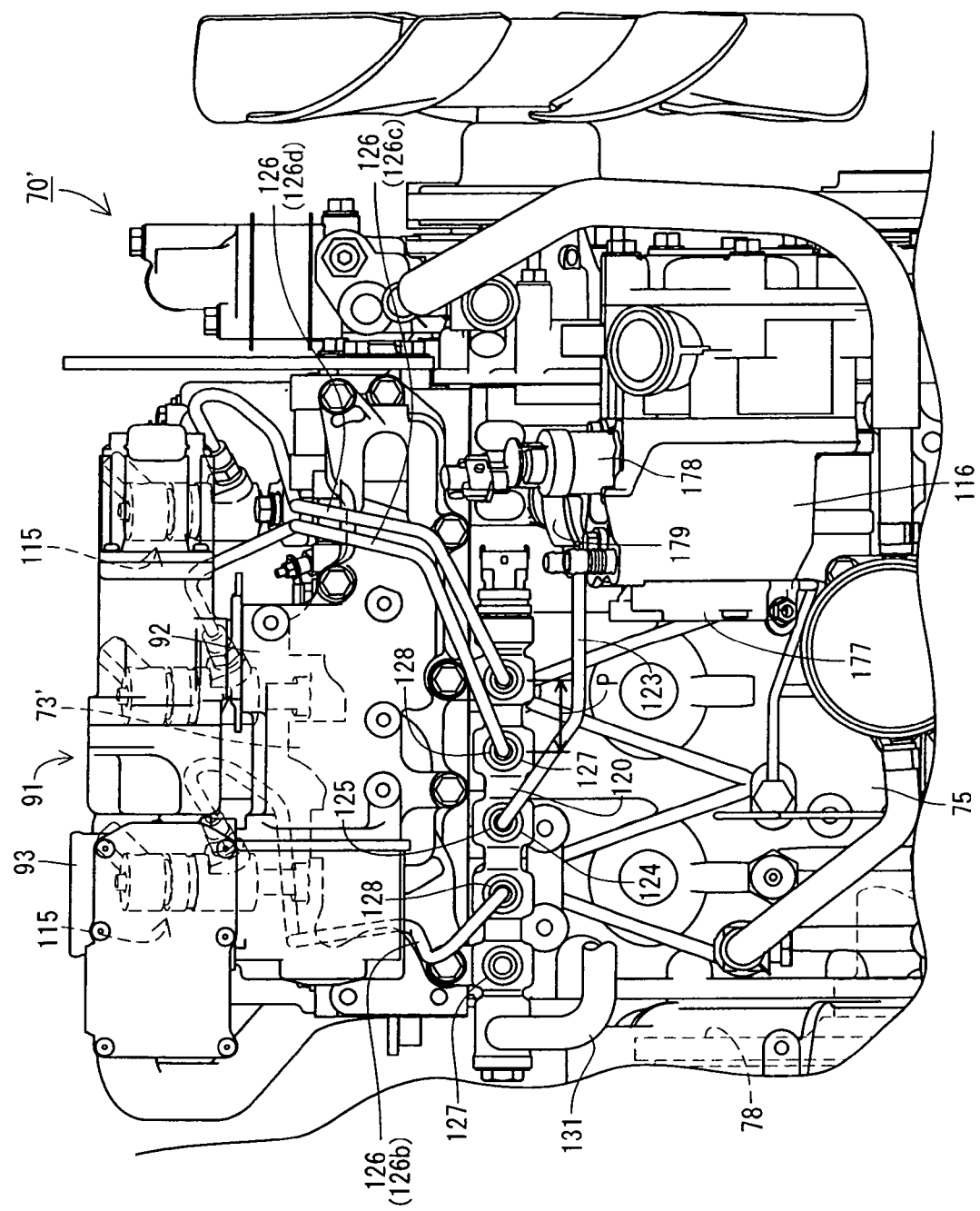
FIG. 22 is an enlarged side view of an essential portion showing a positional relation of the common rail with respect to the fuel pump in the three-cylinder diesel engine wherein the positional relation is arranged in the same manner as that of a four-cylinder diesel engine.
Figure 23:
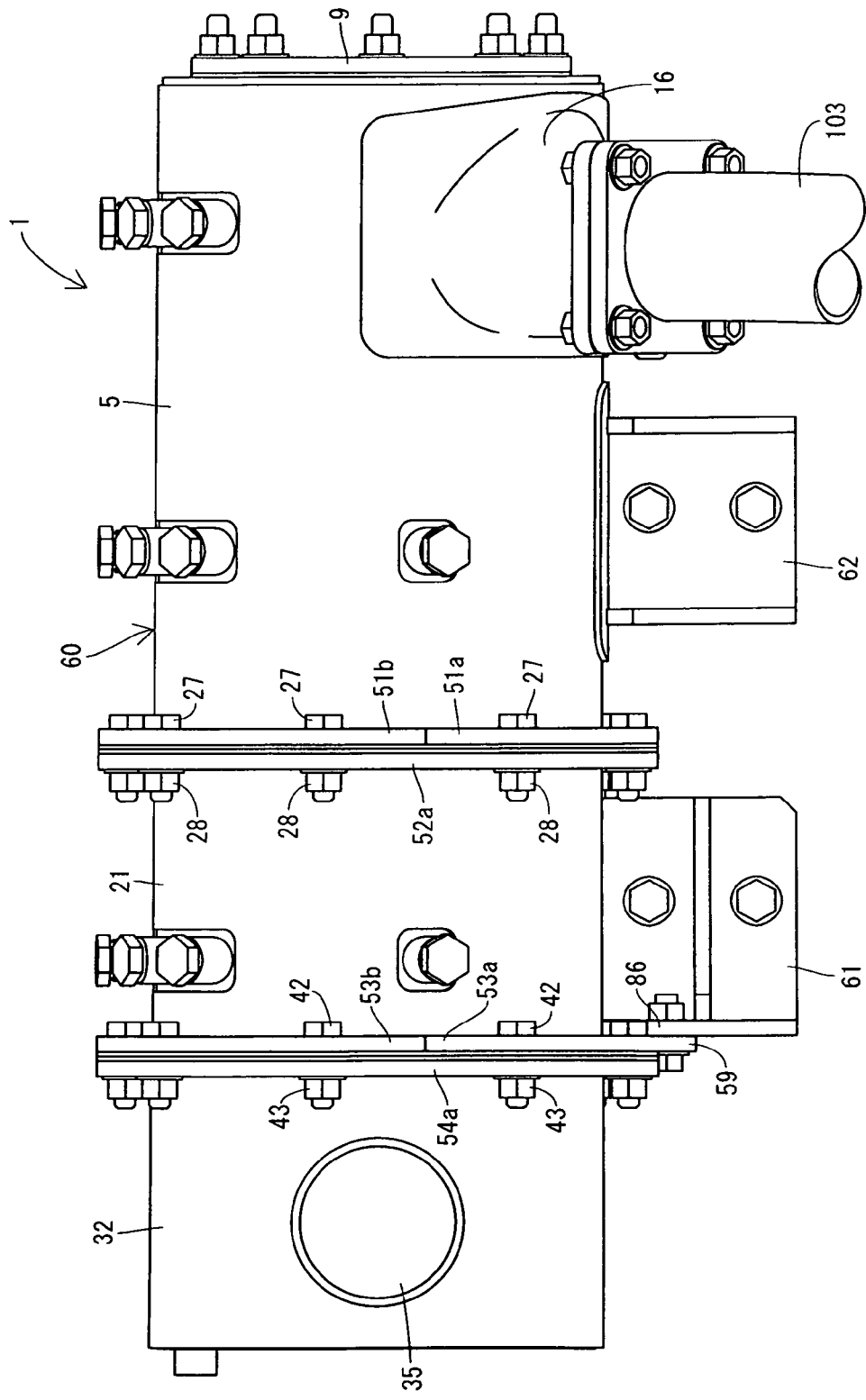
FIG. 23 is a plan view of an outward appearance of the DPF.
Figure 24:
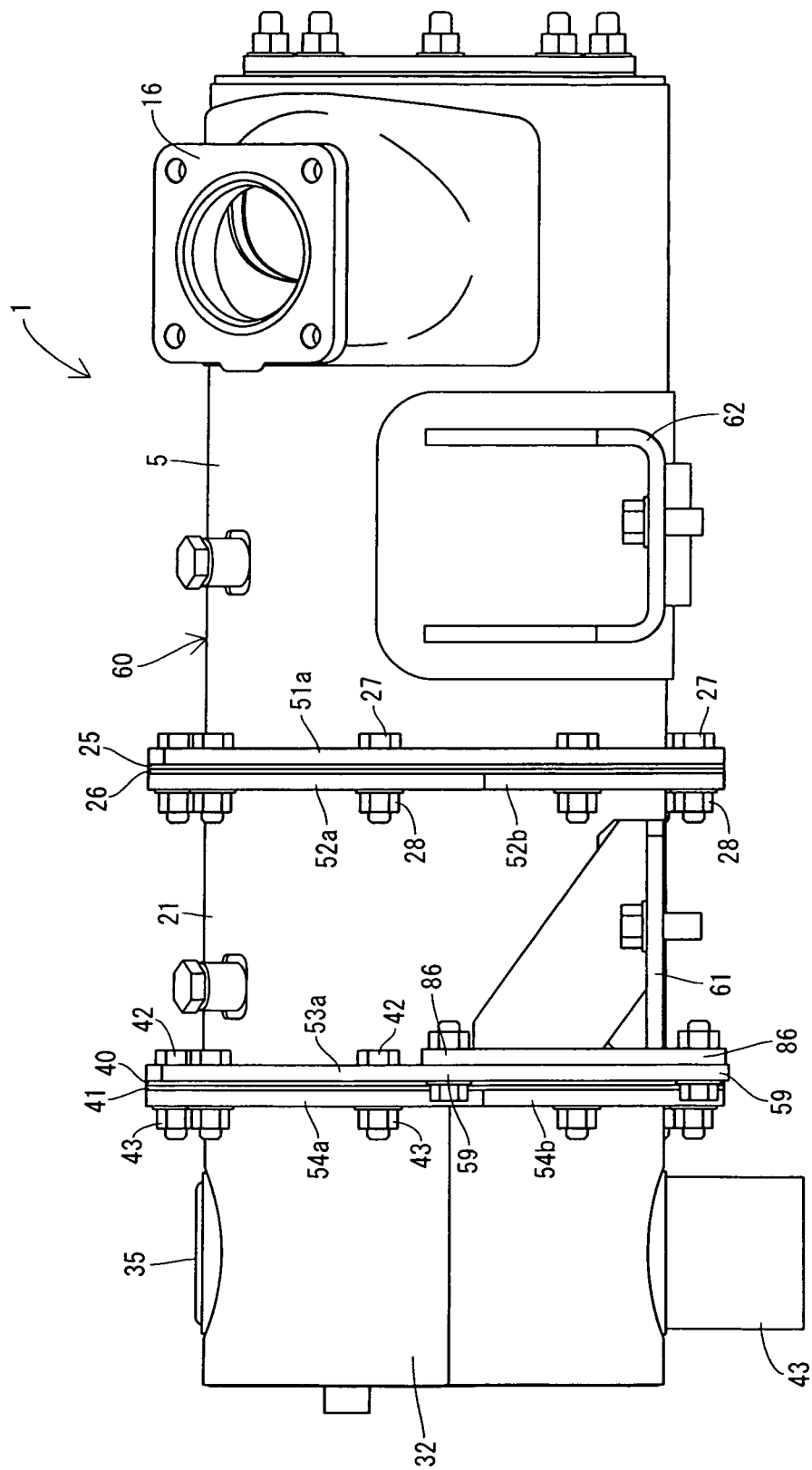
FIG. 24 is a side view of the outward appearance of the DPF.

FIG. 22 shows an example in which a positional relation of the common rail 120 with respect to the fuel pump 116 of the three-cylinder diesel engine 70' is set to the same as that of the four-cylinder diesel engine 70. That is, FIG. 22 shows an example in which the positional relation of the common rail 120 with respect to the fuel pump 116 is set to the same as that of the four-cylinder diesel engine 70. In this example, the other end (rear end) of the common rail 120 in the longitudinal direction protrudes outward from the front surface of the engine block 75 on the side of the flywheel, but the second, third, and fourth fuel injection pipes 126b, 126c, and 126d used for the four-cylinder diesel engine 70 as well as the high pressure pipe 123 are also used in the three-cylinder diesel engine 70' as common parts.

That is, the second fuel injection pipe 126b connects the injector 115 of the three-cylinder diesel engine 70' on the side of the flywheel housing 78 and the second fuel injection pipe connector 127 of the common rail 120 from front to each other. The third fuel injection pipe 126c connects the middle injector 115 of the three-cylinder diesel engine 70' and the fourth fuel injection pipe connector 127 of the common rail 120 from front to each other. The fourth fuel injection pipe 126d connects one of the injectors 115 of the three-cylinder diesel engine 70' on the side of the cooling fan 76 and the rearmost end fuel injection pipe connector 127 of the common rail 120 to each other. The middle high pressure pipe connector 124 of the common rail 120 and the fuel pump 116 are connected to each other through the high pressure pipe 123.

As apparent from the above description and FIGS. 16 to 22, the fuel injection system 117 having the common rail 120 disposed on one side of the engine block 75, 75' near the intake manifold 73, 73'. The common rail 120 is provided with the connectors 124 and 127 arranged at the same pitch distances P from one another in the longitudinal direction of the common rail 120. At least the plurality of fuel injection pipes 126 connected to the groups of the connectors 124 and 127 are made as common parts between the plurality of engines 70 and 70' having different numbers of cylinders without changing the curved shapes of the fuel injection pipes 126 depending on whether the same positional relation of the common rail 120 with respect to the fuel pump 116 located below the intake manifold 73, 73' is employed or the position of the common rail 120 with respect to the fuel pump 116 is deviated by the pitch P of the groups of the connectors 124 and 127. Therefore, it is unnecessary to prepare not only the common rails 120 but also various fuel injection pipes 126 having different curved shapes on a type to type basis of the engines 70 and 70', and the number of parts can be reduced. Therefore, there is an effect that cost can be reduced when the fuel injection system 117 is employed.

As apparent from the above description and FIGS. 16 to 22, the groups of the connectors 124 and 127 of the common rail 120 include the plurality of fuel injection pipe connectors 127 connected to the injectors 115 corresponding to the cylinders of the engine 70, 70' through the fuel injection pipes 126, and the high pressure pipe connectors 124 connected to the fuel pumps 116 through the high pressure pipe 123. The high pressure pipe 123 is made as the common part between the plurality of engines 70 and 70' having the different numbers of cylinders without changing the curved shape. Therefore, like the fuel injection pipes 126, the high pressure pipe 123 need not be for the engine 70, 70' only on a type to type basis, and there is an effect that the number of parts can be further reduced and cost can be further reduced.

(7) Structure of DPF

Next, a structure of the exhaust gas purification device will be described with reference to FIGS. 6, and 23 to 28. As shown in FIGS. 6, and 23 to 27, the engine includes the continuously regenerating diesel particulate filter 1 (DPF) as the exhaust gas purification device. Particulate materials (PM) in exhaust gas can be removed by the DPF 1 and in addition, carbon monoxide (CO) and hydrocarbon (HC) in exhaust gas can be reduced.

Figure 27:
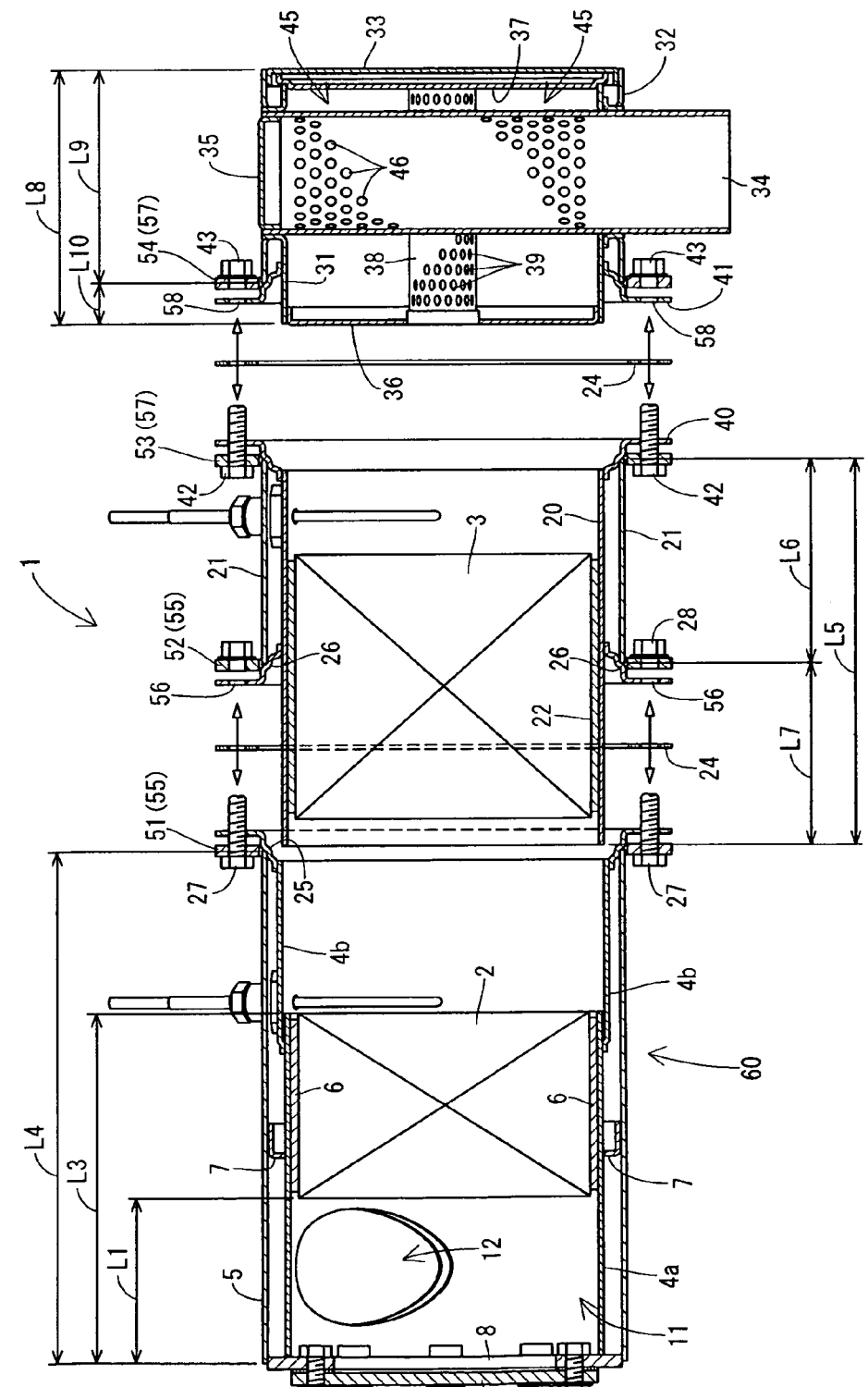
FIG. 27 is an exploded sectional view for explaining the DPF.
Figure 28:
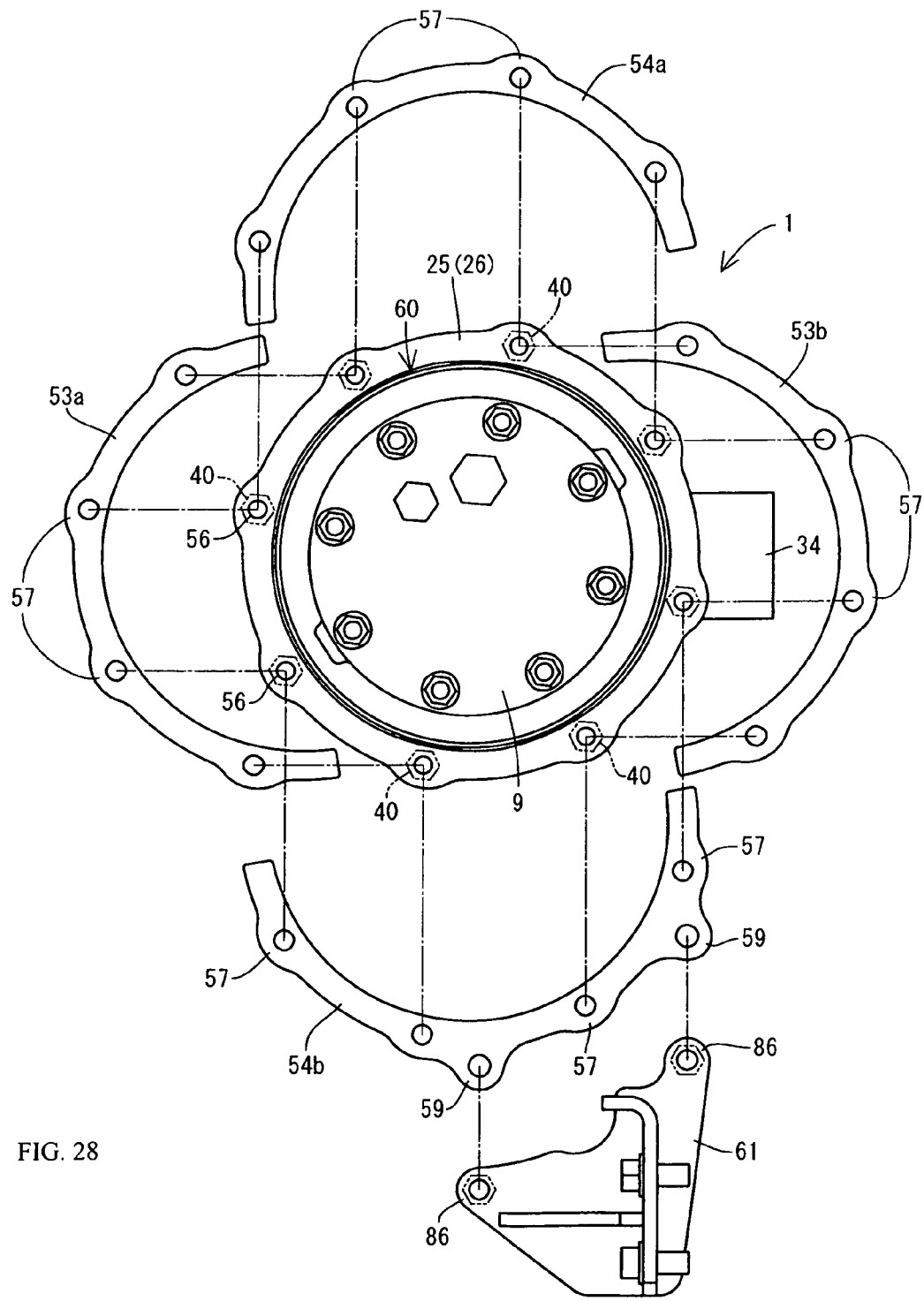
FIG. 28 is a separation side view of a sandwiching flange (unit)

As shown in FIGS. 6 and 27, the diesel oxidation catalyst 2 as one example of filters which purify exhaust gas discharged from the diesel engine 70 is provided in a substantially cylindrical catalyst inner case 4 made of heat-resistant metal. The catalyst inner case 4 is provided in a substantially cylindrical catalyst outer case 5 made of heat-resistant metal. That is, the catalyst inner case 4 is fitted over the outer side of the diesel oxidation catalyst 2 through a mat-shaped catalyst heat insulator 6 made of ceramic fiber. The catalyst outer case 5 is fitted over the outer side of the catalyst inner case 4 through a thin plate support 7 having an L-shaped end surface. The catalyst outer case 5 is one of elements configuring the DPF casing 60. The diesel oxidation catalyst 2 is protected by the catalyst heat insulator 6. The thin plate support 7 reduces stress (deforming force) of the catalyst outer case 5 transmitted to the catalyst inner case 4.

As shown in FIGS. 6 and 27, a disk-like side lid 8 is fixed to one side ends of the catalyst inner case 4 and the catalyst outer case 5 by welding. An outer lid 9 is fastened to an outer surface of the side lid 8 through bolts and nuts. The side lid 8 and one side end surface 2a of the diesel oxidation catalyst 2 are opposed to each other at a constant distance L1 for a gas inflow space from each other. An exhaust gas inflow space 11 is formed between the left side lid 8 and the left end surface 2a of the diesel oxidation catalyst 2. An exhaust gas inflow port 12 which faces the exhaust gas inflow space 11 opens at the catalyst inner case 4 and the catalyst outer case 5. A blockage ring body (not shown) is sandwiched and fixed between an opening edge of the catalyst inner case 4 and an opening edge of the catalyst outer case 5. By blocking a gap between the opening edge of the catalyst inner case 4 and the opening edge of the catalyst outer case 5 by means of the blockage ring body, exhaust gas is prevented from flowing in between the catalyst inner case 4 and the catalyst outer case 5.

As shown in FIGS. 6, 23, 24, and 27, an exhaust gas inlet pipe 16 is disposed on an outer surface of the catalyst outer case 5 in which the exhaust gas inflow port 12 is formed. A flange of one of opening ends of the exhaust gas inlet pipe 16 is connected to a flange of the exhaust gas discharge pipe 103 of the turbine case 101 in the turbo supercharger 100 (see FIGS. 1 and 3). Therefore, the exhaust gas inlet pipe 16 is connected to the exhaust manifold 71 of the diesel engine 70 through the exhaust gas discharge pipe 103 of the turbine case 101. The other opening end of the exhaust gas inlet pipe 16 is welded to the outer surface of the catalyst outer case 5 to cover the exhaust gas inflow port 12 from outside.

According to the above-described configuration, exhaust gas of the diesel engine 70 enters the exhaust gas inlet pipe 16 from the exhaust manifold 71, enters the exhaust gas inflow space 11 from the exhaust gas inlet pipe 16 through the exhaust gas inflow port 12, and the exhaust gas is supplied from the left end surface 2a to the diesel oxidation catalyst 2.

By the oxidation action of the diesel oxidation catalyst 2, nitrogen dioxide (NO2) is produced.

As shown in FIGS. 6 and 27, the soot filter 3 which is one example of filters is provided in a substantially cylindrical filter inner case 20 made of heat-resistant metal. The filter inner case 20 is provided in a substantially cylindrical filter outer case 21 made of heat-resistant metal. That is, the filter inner case 20 is fitted over the outer side of the soot filter 3 through a mat-shaped filter heat insulator 22 made of ceramic fiber. The filter outer case 21 is one of elements configuring the DPF casing 60 together with the catalyst outer case 5. The soot filter 3 is protected by the filter heat insulator 22.

As shown in FIGS. 6 and 27, the catalyst inner case 4 includes a small-diameter cylindrical portion 4a in which the diesel oxidation catalyst 2 is accommodated and a large-diameter cylindrical portion 4b into which the later-described filter inner case 20 is inserted. In this case, a downstream end of the small-diameter cylindrical portion 4a is fitted into an upstream end of the large-diameter cylindrical portion 4b, and superposed portions of the small-diameter cylindrical portion 4a and the large-diameter cylindrical portion 4b are fixed by welding, thereby configuring the catalyst inner case 4 in which a portion thereof is formed into a double cylindrical structure.

A thin plate-like catalyst-side joining flange 25 protruding toward an outer periphery (radially outward) of the catalyst outer case 5 is fixed to a downstream end of the catalyst inner case 4 by welding. A downstream end of the catalyst outer case 5 is fixed to the outer periphery of the catalyst-side joining flange 25 by welding. A thin plate-like filter-side joining flange 26 protruding toward an outer periphery (radially outward) of the filter outer case 21 is fixed to a longitudinally intermediate portion of the filter inner case 20 by welding. An upstream end of the filter outer case 21 is fixed to the outer periphery of the filter-side joining flange 26 by welding.

As shown in FIGS. 6, and 23 to 27, the catalyst-side joining flange 25 and the filter-side joining flange 26 are butted against each other through a packing 24, both the joining flanges 25 and 26 are sandwiched from both sides in the moving direction of exhaust gas by a pair of thick plate-like central sandwiching flanges 51 and 52 which surround outer peripheries of the outer cases 5 and 21. Both the central sandwiching flanges 51 and 52 are fastened to each other together with the joining flanges 25 and 26 through bolts 27 and nuts 28, thereby connecting the catalyst outer case 5 and the filter outer case 21 to each other. A diameter of the cylindrical small-diameter cylindrical portion 4a in the catalyst inner case 4 and a diameter of the cylindrical filter inner case 20 are substantially the same. A diameter of the cylindrical catalyst outer case 5 and a diameter of the cylindrical filter outer case 21 are substantially the same.

Figure 25:
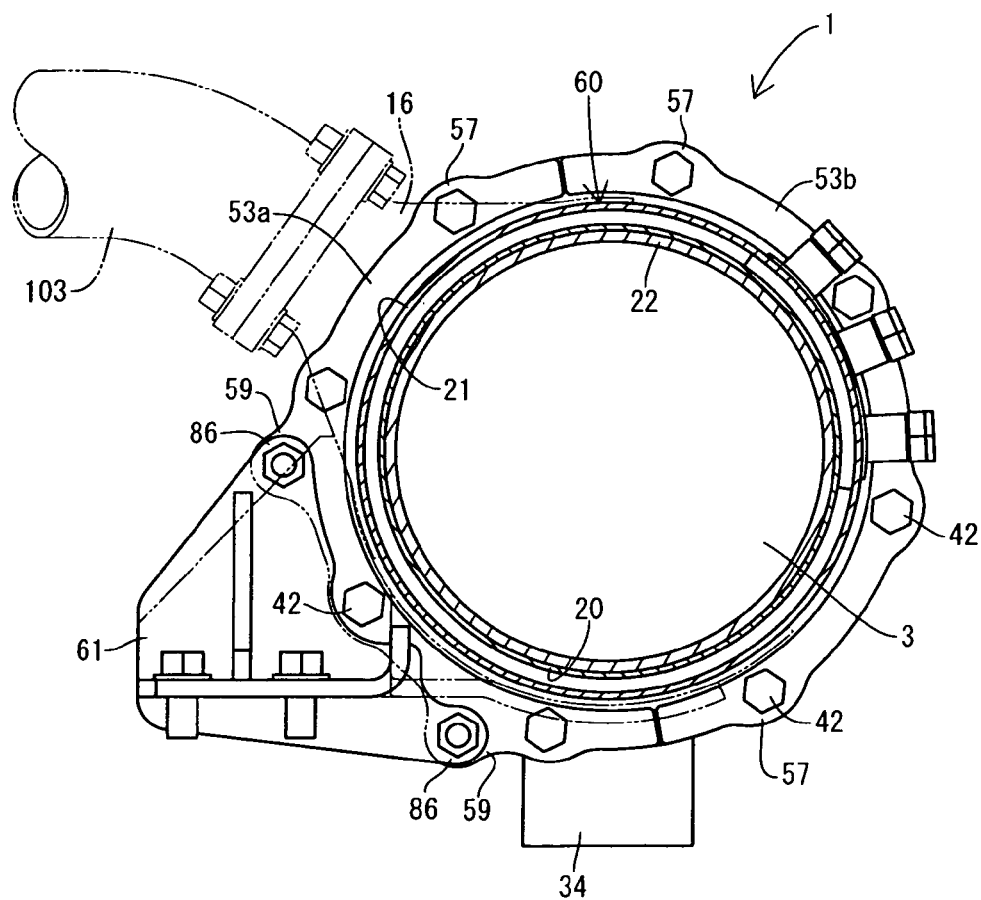
FIG. 25 is a side view of the outward appearance of the DPF on its upstream side.

As shown in FIG. 6, in a state where the filter outer case 21 is connected to the catalyst outer case 5 through both the central sandwiching flanges 51 and 52 and both the joining flanges 25 and 26, an upstream end of the filter inner case 20 is opposed to a downstream end of the catalyst inner case 4 by a constant distance L2 for mounting a sensor. As shown in FIGS. 6 and 25, a cylindrical length L4 of the catalyst outer case 5 in the moving direction of exhaust gas is longer than a cylindrical length L3 of the small-diameter cylindrical portion 4a of the catalyst inner case 4 in the moving direction of exhaust gas. A cylindrical length L6 of the filter outer case 21 in the moving direction of exhaust gas is shorter than a cylindrical length L5 of the filter inner case 20 in the moving direction of exhaust gas. A total length (L2+L3+L5) of the constant distance L2 of a sensor-mounting space 29, the cylindrical length L3 of the small-diameter cylindrical portion 4a of the catalyst inner case 4 and the cylindrical length L5 of the filter inner case 20 is substantially same as a total length (L4+L6) of the cylindrical length L4 of the catalyst outer case 5 and the cylindrical length L6 of the filter outer case 21.

The upstream end of the filter inner case 20 projects from the upstream end of the filter outer case 21 by a length difference thereof (L7=L5−L6). That is, in a state where the filter outer case 21 is connected to the catalyst outer case 5, the upstream end of the filter inner case 20 is inserted into the downstream side (large-diameter cylindrical portion 4b) of the catalyst outer case 5 by the overlap size L7.

According to the above-described configuration, nitrogen dioxide (NO2) produced by oxidation action of the diesel oxidation catalyst 2 is supplied from one side end surface 3a to the soot filter 3. Particulate materials (PM) in exhaust gas of the diesel engine 70 collected by the soot filter 3 are continuously oxidized and removed by nitrogen dioxide (NO2). The particulate materials (PM) in exhaust gas of the diesel engine 70 are removed and in addition, carbon monoxide (CO) and hydrocarbon (HC) in exhaust gas of the diesel engine 70 are reduced.

Figure 26:
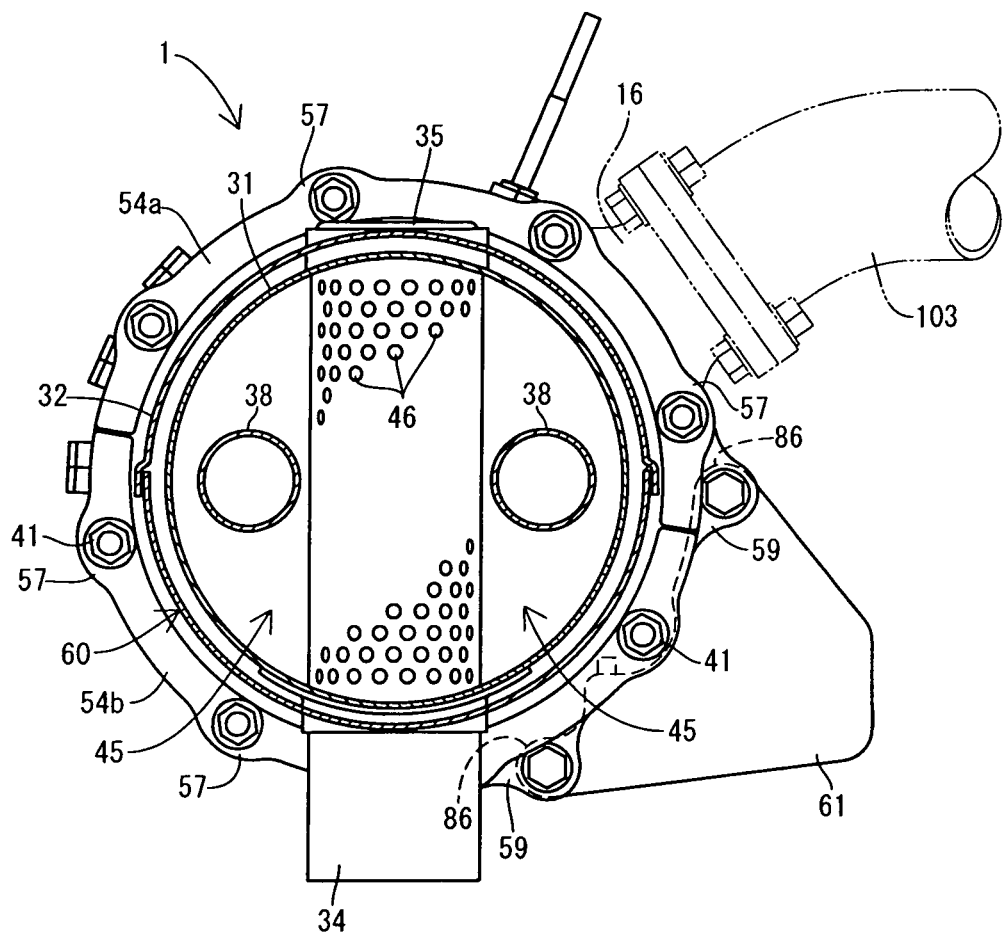
FIG. 26 is a sectional side view of the DPF on its downstream side.

As shown in FIGS. 6, 26, and 27, a damper 30 which damps exhaust gas sound generated by from the diesel engine 70 includes a substantially cylindrical damper inner case 31 made of heat-resistant metal, a substantially cylindrical damper outer case 32 made of heat-resistant metal, and a disk-like side lid 33 fixed to a side end of a downstream side of the damper outer case 32 by welding. The damper inner case 31 is provided in the damper outer case 32. The damper outer case 32 is also one of elements configuring the DPF casing 60 together with the catalyst outer case 5 and the filter outer case 21. The cylindrical damper outer case 32 has a substantially same size as a diameter of the cylindrical catalyst outer case 5 and a diameter of the cylindrical filter outer case 21.

Disk-like inner lids 36 and 37 are fixed, by welding, to both side ends of the damper inner case 31 in the moving direction of exhaust gas. A pair of exhaust gas introducing pipes 38 is provided between both the inner lids 36 and 37. Upstream sides of both the exhaust gas introducing pipes 38 penetrate the upstream inner lid 36. Downstream sides of both the exhaust gas introducing pipes 38 are closed with the downstream inner lid 37. A plurality of communication holes 39 are formed in outer peripheries of the exhaust gas introducing pipes 38. A space between both the inner lids 36 and 37 in the damper inner case 31 is an expansion chamber 45 which is in communication with both the exhaust gas introducing pipes 38 through the communication holes 39.

An exhaust gas outlet pipe 34 passing between both the exhaust gas introducing pipes 38 penetrates the damper inner case 31 and the damper outer case 32. One end of the exhaust gas outlet pipe 34 is closed with an outlet lid 35. A large number of exhaust holes 46 are formed in the entire exhaust gas outlet pipe 34 in the damper inner case 31. Both the exhaust gas introducing pipes are in communication with the exhaust gas outlet pipe 34 through the plurality of communication holes 39, the expansion chamber 45, and the large number of exhaust holes 46. A tailpipe and an existing damper member (not shown) are connected to the other end of the exhaust gas outlet pipe 34. According to the above-described configuration, exhaust gas which enters both the exhaust gas introducing pipes 38 of the damper inner case 31 passes through the exhaust gas outlet pipe 34 through the plurality of communication holes 39, the expansion chamber 45, and the large number of exhaust holes 46 and is discharged outside of the damper 30.

As shown in FIGS. 6 and 27, a thin plate-like filter outlet-side joining flange 40 protruding toward an outer periphery (radially outward) of the filter outer case 21 is fixed to a downstream end of the filter inner case 20 by welding. Downstream end of the filter outer case 21 is fixed to an outer periphery of the filter outlet-side joining flange 40 by welding. A thin plate-like damper-side joining flange 41 protruding toward an outer periphery (radially outward) of the damper outer case 32 is fixed to an upstream end of the damper inner case 31 by welding. An upstream end of the damper outer case 32 is fixed to an outer periphery of the damper-side joining flange 41 by welding.

As shown in FIGS. 6 and 23 to 27, the filter outlet-side joining flange 40 and the damper-side joining flange 41 are butted against each other through the packing 24, both the joining flanges 40 and 41 are sandwiched from both sides of the moving direction of exhaust gas by the pair of thick plate-like outlet sandwiching flanges 53 and 54 which surround outer peripheries of the outer cases 21 and 32, and both the outlet sandwiching flanges 53 and 54 are fastened to each other together with both the joining flanges 40 and 41 through bolts 42 and nuts 43, thereby connecting the filter outer case 21 and the damper outer case 32 to each other.

As shown in FIGS. 6 and 27, a cylindrical length L9 of the damper outer case 32 in a moving direction of exhaust gas is shorter than a cylindrical length L8 of the damper inner case 31 in the moving direction of exhaust gas. An upstream end of the damper inner case 31 projects from an upstream end of the damper outer case 32 by a length difference thereof (L10=L8−L9). That is, in a state where the damper outer case 32 is connected to the filter outer case 21, the upstream end of the damper inner case 31 is inserted into the downstream side (filter outlet-side joining flange 40) of the filter outer case 21 by the overlap size L10.

As shown in FIGS. 6 and 23 to 27, the thick plate-like central sandwiching flange 51 (52) includes a plurality of (two in the embodiment) units 51a and 51b (52a and 52b) divided in a circumferential direction of the catalyst outer case 5 (filter outer case 21). Each of the units 51a and 51b (52a and 52b) in the embodiment is formed into an arc shape (substantially semicircular shape). In a state where the filter outer case 21 is connected to the catalyst outer case 5, ends of the units 51a and 51b (52a and 52b) are butted against each other along the circumferential direction, and the units 51a and 51b (52a and 52b) annularly surround an outer periphery of the catalyst outer case 5 (filter outer case 21). The catalyst-side units 51a and 51b and the filter-side units 52a and 52b have the same modes (are same kinds).

A plurality of bolt fastening portions 55 having through holes are provided on the central sandwiching flange 51 (52) at equal distances from one another along the circumferential direction. In the embodiment, eight bolt fastening portions 55 are provided per one set of central sandwiching flanges 51. If each of the units 51a and 51b (52a and 52b) is viewed singly, four bolt fastening portions 55 are provided at equal distances from one another along the circumferential direction. Bolt holes 56 corresponding to the bolt fastening portions 55 of the central sandwiching flange 51 (52) are formed in the catalyst-side joining flange 25 and the filter-side joining flange 26 such that the bolt holes 56 penetrates the flanges 25 and 26.

When the catalyst outer case 5 and the filter outer case 21 are connected to each other, both the units 51a and 51b surround the outer periphery of the catalyst outer case 5, both the units 52a and 52b surround the outer periphery of the filter outer case 21, and the catalyst-side joining flange 25 and the filter-side joining flange 26 sandwiching the packing 24 are sandwiched from both sides in the moving direction of exhaust gas by the unit groups (central sandwiching flanges 51 and 52). In this state, bolts 27 are inserted into the bolt fastening portions 55 of both the central sandwiching flanges 51 and 52 and bolt holes 56 of both the joining flanges 25 and 26, and they are fastened together by nuts 28. As a result, both the joining flanges 25 and 26 are sandwiched and fixed by both the central sandwiching flanges 51 and 52, and the connecting operation between the catalyst outer case 5 and the filter outer case 21 is completed. Butted portions of ends of the catalyst-side units 51a and 51b and the filter-side units 52a and 52b are deviated from each other in phase by about 90°.

As shown in FIGS. 6 and 23 to 27, a thick plate-like outlet sandwiching flange 53 (54) includes a plurality of (two in the embodiment) units 53a and 53b (54a and 54b) divided in a circumferential direction of the filter outer case 21 (damper outer case 32). The units 53a and 53b (54a and 54b) of this embodiment have basically the same modes as those of the units 51a and 51b (52a and 52b) of the central sandwiching flange 51 (52). A plurality of bolt fastening portions 57 having through holes are provided also on the outlet sandwiching flange 53 (54) at equal distances from one another along the circumferential direction. Bolt holes 58 corresponding to the bolt fastening portions 57 of the outlet sandwiching flange 53 (54) are formed in the filter outlet-side joining flange 40 and the damper-side joining flange 41 such that the bolt holes 58 penetrate the flanges 40 and 41.

When the filter outer case 21 and the damper outer case 32 are connected to each other, both the filter outlet-side units 53a and 53b surround the outer periphery of the filter outer case 21, both the damper-side units 54a and 54b surround the outer periphery of the damper outer case 32, and the filter outlet-side joining flange 40 and the damper-side joining flange 41 sandwiching the packing 24 are sandwiched from both sides in the moving direction of exhaust gas by the unit groups (outlet sandwiching flanges 53 and 54). In this state, bolts 42 are inserted into the bolt fastening portions 57 of both the outlet sandwiching flanges 53 and 54 and bolt holes 58 of both the joining flanges 40 and 41, and they are fastened together by nuts 43. As a result, both the joining flanges 40 and 41 are sandwiched and fixed by both the outlet sandwiching flanges 53 and 54, and the connecting operation between the filter outer case 21 and the damper outer case 32 is completed. Butted portions of ends of the filter outlet-side units 53a and 53b and the damper-side units 54a and 54b are deviated from each other in phase by about 90°.

As shown in FIGS. 23 to 26, and 28, a left bracket foot 61 as a support body which supports the DPF casing 60 (outer cases 5, 21, and 32) on the diesel engine 70 is mounted on at least one of the sandwiching flanges 51 to 54. In the embodiment, support body fastening portions 59 having through holes are formed in one of units (53a) of the filter outlet-side outlet sandwiching flange 53 at two locations between the adjacent bolt fastening portions 57. Mounting boss portions 86 corresponding to the support body fastening portions 59 are integrally formed on the left bracket foot 61. The mounting boss portion 86 of the left bracket foot 61 is fastened to the support body fastening portion 59 of one of units (53a) located on the filter outlet side through a bolt, thereby detachably fixing the left bracket foot 61 to the filter outlet-side outlet sandwiching flange 53. One end of a right bracket foot 62 is fixed to an outer periphery of the DPF casing 60 (catalyst outer case 5) by welding, and other ends of the right and left bracket feet 61 and 62 are fastened to the DPF mounting portion 80 formed on the upper surface of the flywheel housing 78 through a bolt as described above. As a result, the DPF 1 is stably connected to and supported on the upper portion of the flywheel housing 78 which is a high rigid member by both the right and left bracket feet 61 and 62 and the exhaust gas discharge pipe 103 of the turbine case 101.

As apparent from the above description and FIGS. 6 and 23 to 28, the exhaust gas purification device 1 includes the filters 2 and 3 which purify exhaust gas discharged from the engine 70, the inner cases 4, 20, and 31 in which the filters 2 and 3 are incorporated, and the outer cases 5, 21, and 32 in which the inner cases 4, 20, and 31 are incorporated. The inner cases 4, 20, and 31 are connected to the outer cases 5, 21 and 32 through the joining flanges 25, 26, 40, and 41 protruding toward outer peripheries of the outer cases 5, 21, and 32. The exhaust gas purification device includes a plurality of combinations of the filters 2 and 3, the inner cases 4, 20 and 31 and the outer cases 5, 21, and 32. Both the joining flanges 25 and 26 (40 and 41) are sandwiched and fixed between the pair of sandwiching flanges 51 and 52 (53 and 54), thereby connecting the plurality of outer cases 5, 21, and 32. Hence, the adjacent joining flanges 25 and 26 (40 and 41) can be sandwiched between both the sandwiching flanges 51 and 52 (53 and 54) and contacted under pressure (intimate contacted) to each other. Further, since the sandwiching flanges 51 to 54 are formed as independent members without welding them to the outer cases 5, 21, and 32, there is no fear that a problem of stress concentration or distortion caused by welding is generated in the relation between the sandwiching flanges 51 to 54 and the outer cases 5, 21, and 32. Hence, a substantially uniform pressing force can be applied to both the entire joining flanges 25 and 26 (40 and 41), and high surface pressures of seal surfaces (sandwiching surfaces) of the sandwiching flanges 51 to 54 can be maintained. As a result, there is an effect that it is possible to reliably prevent exhaust gas from leaking from between both the joining flanges 25 and 26 (40 and 41).

As apparent from the above description and FIGS. 6 and 23 to 28, since a support body 61 which supports the outer cases 5, 21 and 32 on the engine 70 is fastened to at least one of the sandwiching flanges 51 to 54, the support body 61 is also formed as an independent member without being welded to the sandwiching flanges 51 to 54. Hence it is possible to avoid the problem of stress concentration or distortion caused by welding also in a relation between the support body 61 and at least one of the sandwiching flanges 51 to 54. Therefore, there is an effect that it is possible to enhance adhesion when the support body 61 and at least one of the sandwiching flanges 51 to 54 are fastened to each other, and to enhance the rigidity.

As apparent from the above description and FIGS. 6 and 23 to 28, each of the sandwiching flanges 51 to 54 is provided with the plurality of bolt fastening portions 55 and 57, and the sandwiching flange 53 to which the support body 61 is fastened is provided with the support body fastening portion 59 between the adjacent bolt fastening portions 55. Hence, even if the support body 61 tries to deform by stress caused by vibration of the engine 70 for example, it is possible to remarkably suppress fear that the support body fastening portion 59 and thus the sandwiching flange 53 are deformed, by the action of the adjacent bolt fastening portions 61. As a result, there is an effect that it is possible to further lower the possibility of leakage of exhaust gas.

As apparent from the above description and FIGS. 6 and 23 to 28, each of the sandwiching flanges 51 to 54 includes the plurality of units 51a and 51b (52a, 52b, 53a, 53b, 54a, 54b) divided in the circumferential direction of the outer cases 5, 21, and 32, and the plurality of units 51a and 51b (52a, 52b, 53a, 53b, 54a, 54b) surround the outer peripheries of the outer cases 5, 21, and 32. Hence, although the sandwiching flanges 51 to 54 include the plurality of units 51a and 51b (52a, 52b, 53a, 53b, 54a, 54b), they can be handled as one integral piece. Therefore, it is easy to assemble them and the assembling operability can be enhanced. There is an effect that it is possible to suppress machining cost and assembling cost, and to provide a DPF 1 having high sealing performance.

Figure 29:
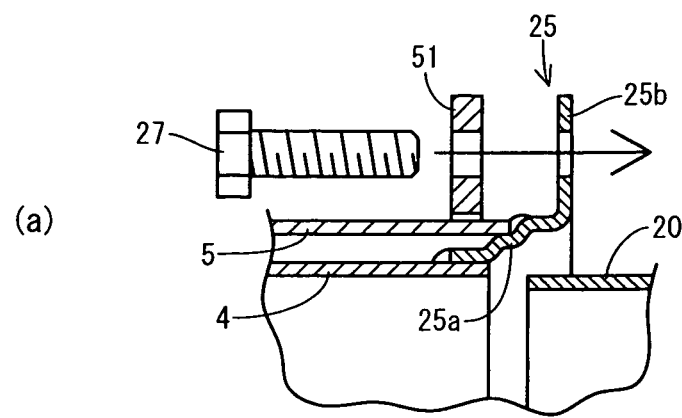
FIG. 29(*a*) is an enlarged sectional side view of a catalyst-side joining flange in an embodiment, FIG. 29(*b*) is an enlarged sectional side view of a catalyst-side joining flange of a first another example and FIG. 29(*c*) is an enlarged sectional side view of a catalyst-side joining flange of a second another example.
Figure 29:
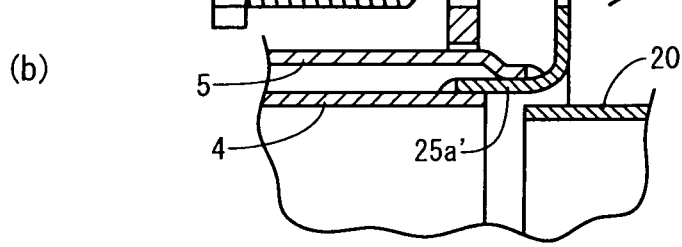
Figure 29:
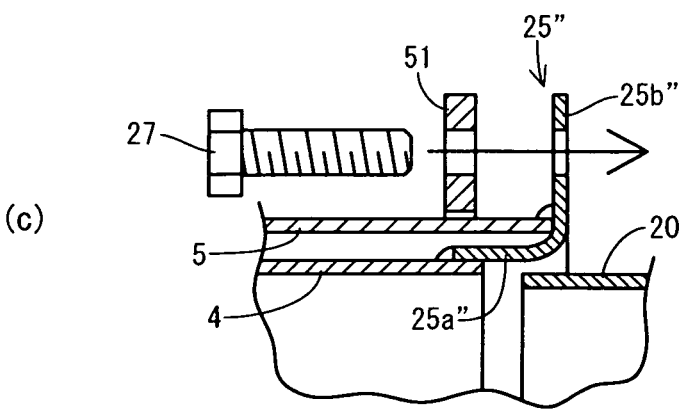

Next, detailed structure of the joining flanges 25, 26, 40, and 41 will be described with reference to FIGS. 29(a) to 29(c). Here, since the configurations of the joining flanges 25, 26, 40, and 41 are basically the same, the catalyst-side joining flange 25 which is fixed to the catalyst inner case and the catalyst outer case by welding will be described below as a representative example. FIG. 29(a) is an enlarged sectional side view of the catalyst-side joining flange 25 in the embodiment. According to the catalyst-side joining flange 25 shown in FIG. 29(a), a base end 25a located between the catalyst inner case 4 and the catalyst outer case 5 is bent in a stepwise form. The existence of the stepwise-shaped base end 25a of the catalyst-side joining flange 25 exerts a rib effect, and high rigidity of the catalyst-side joining flange 25 is secured. The protrusion 25b of the catalyst-side joining flange 25 is sandwiched between the sandwiching flanges 51 and 52 as described above.

FIGS. 29(b) and 29(c) show other examples of the joining structures of the catalyst-side joining flanges 25' and 25". The catalyst-side joining flanges 25' and 25" in FIGS. 29(b) and 29(c) have L-shaped cross sections. In a first other example in FIG. 29(b), a base end 25a' of the catalyst-side joining flange 25' which extends along a longitudinal direction of the catalyst inner case 4 is fixed to a downstream end of the catalyst inner case 4 by welding. A downstream end of the catalyst outer case 5 is inwardly bent (toward the catalyst inner case 4), and the bent tip end is fixed to the base end 25a' of the catalyst-side joining flange 25' by welding. Like the case shown in FIG. 29(a), the protrusion 25b' of the catalyst-side joining flange 25' is sandwiched between the sandwiching flanges 51 and 52. According to the second other example shown in FIG. 29(c), a base end 25a" of the catalyst-side joining flange 25" is fixed to a downstream end of the catalyst inner case 4 by welding. A downstream end of the catalyst outer case 5 is fixed to a protrusion 25b" of the catalyst-side joining flange 25" by welding without being bent. These joining structures shown in FIGS. 29(b) and 29(c) can also be employed. If the joining structure in FIG. 29(b) is employed, it is possible to secure rigidity by the rib effect by bending the downstream end of the catalyst outer case 5. Further, since the welded portion between the catalyst outer case 5 and the catalyst-side joining flange 25' is separated from the protrusion 25b' of the catalyst-side joining flange 25 (seal surface (sandwiched surface) of both the sandwiching flanges 51 and 52), vibration and stress of the diesel engine 70 are less prone to exert influence on the welded portion between the catalyst outer case 5 and the catalyst-side joining flange 25', and there is a merit that it is possible to avoid the problem of stress concentration or distortion caused by welding.

(8) Others

The invention of the present application is not limited to the above embodiment, and the invention can be variously embodied. For example, the engine of the invention of the application can be widely applied to an agricultural machine such as a combine and a tractor, and to various vehicles such as a special operating vehicle like a backhoe and a forklift car. Configurations of various portions of the invention of the application are not limited to the illustrated embodiment, and the invention can be variously modified within a range not departing from the principle of the invention of the application.

REFERENCE SIGNS LIST a Crank axis
1 DPF
2 Diesel oxidation catalyst
3 Soot filter
4, 20, 31 Inner case
5, 21, 32 Outer case
25, 26, 40, 41 Joining flange
51, 52, 53, 54 Sandwiching flange
51a, 51b, 52a, 52b, 53a, 53b, 54a, 54b Unit
55, 57 Bolt fastening portion
56, 58 Bolt hole
59 Support body fastening portion
60 DPF casing
61, 62 Bracket foot
70 Diesel engine
71 Exhaust manifold
73 Intake manifold
74 Crankshaft
75 Engine block
76 Cooling fan
78 Flywheel housing

The invention claimed is:

1. An exhaust gas purification device comprising:
   a filter for purifying exhaust gas discharged from an engine;
   inner cases incorporating the filter; and
   outer cases incorporating the inner cases; and
   wherein the inner cases are connected to the outer cases through a pair of joining flanges which protrude toward outer peripheries of the outer cases;
   wherein the exhaust gas purification device includes a plurality of combinations of the filter, the inner cases, and the outer cases;
   wherein both the joining flanges are sandwiched axially and fixed between a pair of axially opposed sandwiching flanges, thereby connecting the plurality of outer cases to each other;
   wherein each of the sandwiching flanges is comprised of a plurality of units divided in a circumferential direction of the outer case, and the plurality of units surround an outer periphery of the outer case;
   wherein a support body for supporting the outer case on the engine is fastened to at least one of the sandwiching flanges; and
   wherein a support body fastening portion on which the support body is fastened is provided on one unit among the plurality of units comprising the sandwiching flanges on which the support body is fastened.

2. The exhaust gas purification device according to claim 1, wherein a plurality of bolt fastening portions are provided on each of the sandwiching flanges, and the sandwiching flange to which the support body is fastened is provided with a support body fastening portion between the adjacent bolt fastening portions.

* * * * *